United States Patent
Dugardin et al.

(10) Patent No.: US 12,206,767 B2
(45) Date of Patent: Jan. 21, 2025

(54) METHODS AND DEVICES FOR SECURED IDENTITY-BASED ENCRYPTION SYSTEMS WITH TWO TRUSTED CENTERS

(71) Applicant: SECURE-IC SAS, Cesson-Sevigne (FR)

(72) Inventors: Margaux Dugardin, Rennes (FR); Adrien Facon, Paris (FR); Sylvain Guilley, Paris (FR)

(73) Assignee: SECURE-IC SAS, Cesson-Sevigne (FR)

( * ) Notice: Subject to any disclaimer, the term of this patent is extended or adjusted under 35 U.S.C. 154(b) by 617 days.

(21) Appl. No.: 17/298,940

(22) PCT Filed: Dec. 6, 2019

(86) PCT No.: PCT/EP2019/083944
§ 371 (c)(1),
(2) Date: Jun. 1, 2021

(87) PCT Pub. No.: WO2020/115266
PCT Pub. Date: Jun. 11, 2020

(65) Prior Publication Data
US 2022/0038267 A1    Feb. 3, 2022

(30) Foreign Application Priority Data

Dec. 6, 2018   (EP) .................... 18306631

(51) Int. Cl.
*H04L 9/08* (2006.01)
*H04L 9/30* (2006.01)
*H04L 9/32* (2006.01)

(52) U.S. Cl.
CPC .......... *H04L 9/0847* (2013.01); *H04L 9/3073* (2013.01); *H04L 9/321* (2013.01); *H04L 9/3236* (2013.01)

(58) Field of Classification Search
CPC ... H04L 9/3073; H04L 9/3236; H04L 9/0847; H04L 9/321
See application file for complete search history.

(56) References Cited

U.S. PATENT DOCUMENTS

| | | | |
|---|---|---|---|
| 7,239,701 B1 | 7/2007 | Ogishi et al. | |
| 8,108,678 B1 * | 1/2012 | Boyen | H04L 9/0847 713/176 |

(Continued)

FOREIGN PATENT DOCUMENTS

| | | | | |
|---|---|---|---|---|
| EP | 1519530 A1 * | 3/2005 | | H04L 63/0428 |
| WO | 2013/116928 A1 | 8/2013 | | |

OTHER PUBLICATIONS

Boneh and Franklin, Identity-Based Encryption from the Weil Pairing SIAM J.of Computing, vol. 32, No. 3, pp. 586-615 (Year: 2003).*

(Continued)

*Primary Examiner* — Alexander Lagor
*Assistant Examiner* — Robert Matijasec
(74) *Attorney, Agent, or Firm* — BakerHostetler

(57) ABSTRACT

A transmitter device for sending an encrypted message to a receiver device in an identity-based cryptosystem, the identity-based cryptosystem includes a transmitter trusted center connected to the transmitter device and a receiver trusted center connected to the receiver device. The transmitter device is configured to: receive, from the transmitter trusted center, two public authentication keys; check if a set of conditions related to a transmitter trusted center public key, to a receiver trusted center public key, and to a transmitter authentication key comprised in the two public authentication keys are satisfied; determine a ciphertext set comprising an encrypted message if the set of conditions are satisfied; send the ciphertext set to the receiver device.

13 Claims, 9 Drawing Sheets

(56) References Cited

U.S. PATENT DOCUMENTS

| | | | | |
|---|---|---|---|---|
| 9,065,637 | B2* | 6/2015 | Spector | H04L 9/0847 |
| 2003/0081785 | A1* | 5/2003 | Boneh | H04L 9/0847 380/277 |
| 2005/0089173 | A1* | 4/2005 | Harrison | H04L 9/3073 380/277 |
| 2009/0208005 | A1* | 8/2009 | Kusakawa | H04L 9/3073 713/168 |
| 2014/0294177 | A1* | 10/2014 | Shastry | H04L 9/0825 380/46 |

OTHER PUBLICATIONS

Shamir, "Identity-Based Cryptosystems and Signature Schemes", Advances in Cryptology, CRYPTO, pp. 47-53, 1985.

Boneh, et al., "Identity-Based Encryption from the Weil Pairing," Advances in Cryptology, CRYPTO 2001.

Cocks, "An Identity-Based Encryption Scheme Based on Quadratic Residues", Cryptography and Coding, 2001.

Al-Riyami, et al., "Certificateless Public Key Cryptography," Advances in Cryptology—ASIACRYPT, 2003.

Beato, et al., "Practical identity-based private sharing for online social networks", Computer Communications, vol. 73, Part B, pp. 243-250, Jul. 16, 2015.

Sakai, et al., "ID based Cryptosystems with Pairing on Elliptic Curve", Applied Mathematics, Cryptosystems, http://eprint.iacr.org/2003/054, Mar. 24, 2003.

Paterson, et al., "Security and Anonymity of Identity-Based Encryption with Multiple Trusted Authorities", Pairing-Based Cryptography—Pairing 2008, pp. 354-375, Sep. 1, 2008.

\* cited by examiner

METHODS AND DEVICES FOR SECURED IDENTITY-BASED ENCRYPTION SYSTEMS WITH TWO TRUSTED CENTERS

CROSS-REFERENCE TO RELATED APPLICATIONS

This application is a National Stage of International patent application PCT/EP2019/083944, filed on Dec. 6, 2019, which claims priority to foreign European patent application No. EP 18306631.5, filed on Dec. 6, 2018, the disclosures of which are incorporated by reference in their entirety.

TECHNICAL FIELD

The invention generally relates to cryptosystems and in particular to the security of identity-based encryption systems with two trusted centers.

BACKGROUND

Cryptographic mechanisms are used in many fields to protect stored, processed, and transferred information against interceptors or eavesdroppers. Several keyed cryptographic algorithms exist. They rely on the use of secret/private information to protect data and provide confidentiality, integrity, authenticity, and non-repudiation services.

In key-based cryptographic systems, cryptographic keys are used to generate ciphertext data from original data through an encryption mechanism and to recover the original data through a decryption mechanism. The encryption mechanism uses an encryption key, while the decryption mechanism uses a decryption key. The encryption key and the decryption key may be either similar or different.

In symmetric-key cryptosystems, the encryption key and the decryption key are the same, the same cryptographic key being used for encryption of original data and decryption of plaintext. The encryption and decryption keys in symmetric-key cryptosystems represent a shared secret between the users that is used to maintain a private information link. Exemplary symmetric-key cryptosystems comprise the Diffie-Hellman key exchange method, and the AES (Advanced Encryption Standard) cryptosystems.

In public-key cryptosystems, the encryption key and the decryption key are different. More specifically, in a public-key cryptosystem, each user of the cryptosystem generates a pair of encryption key/decryption key. The encryption key, also referred to as a public key, is a public value that the user publishes/disseminates to the remaining users of the cryptosystem. The decryption key, also referred to as a private key, is secret and kept known only by the owner. Any user of a public-key cryptosystem can encrypt a message using the public key of the recipient. The encrypted message can only be decrypted with the private key of the recipient. Public-key cryptosystems allow public key encryption, ensure confidentiality, and allow digital signatures in which a message can be signed with a user's private key and verified with the user's public key. Exemplary public-key cryptosystems comprise the RSA (Rivest-Shamir-Adleman) cryptosystems.

A major challenge of public-key cryptosystems is to ensure the authenticity of public keys, which involves ensuring that a particular public key is correct, belongs to the claimed user, and has not been tampered or replaced by a malicious third party. In order to guarantee the authenticity of public keys, existing public-key cryptosystems use a public key infrastructure in which one or more certificate authorities certify ownership of public/private keys.

In "A. Shamir, Identity-Based Cryptosystems and Signature Schemes, In: Blakley G. R., Chaum D. (eds) Advances in Cryptology, CRYPTO 1984", Shamir proposed a novel type of public cryptographic schemes, referred to as 'identity-based cryptosystems'. The identity-based cryptosystems and signature schemes enable a secure communication of message and verification of signatures between the users of a cryptosystem without exchanging private or public keys. Such cryptosystems comprise a center referred to as a 'trusted center' or a 'public-key generation center' and rely on the use of an identity information that uniquely identifies each user in the cryptosystem to generate a public/private key common to each user. The role of the trusted center is to give to each user a private key when the user first joins the system. During a setup step, the trusted center determines, from a given security parameter, global system parameters and a secret master key. The global system parameters are then made public to all the users. Then, during a key generation step, the trusted center receives the identity information of each user, computes a private key in association with the identity information, and sends to each user his private key. The trusted center computes the private keys of all the users in the system using the global system parameters and the secret master key it previously determined from the security parameter. Messages are encrypted by the users using the global system parameters and the identity information of the receiver of the encrypted message, used as a public key. Encrypted messages are decrypted using the global system parameters and the private key associated with the identity information that was used in the encryption step as encryption key.

Several identity-based cryptographic schemes have been developed, including:
  "D. Boneh and M. K. Franklin, Identity-Based Encryption from the Weil Pairing, In: Kilian J. (eds) Advances in Cryptology, CRYPTO 2001";
  "C. Cocks, An Identity-Based Encryption Scheme Based on Quadratic Residues, In: Honary B. (eds) Cryptography and Coding. Cryptography and Coding 2001";
  "S. S. Al-Riyami and K. G. Paterson, Certificateless Public Key Cryptography, In: Laih CS. (eds) Advances in Cryptology—ASIACRYPT 2003";
  Patent application No. EP1519530A1 that describes a method for establishing an encrypted communication by means of keys;
  U.S. Pat. No. 7,239,701 B1;
  US Patent No. US 2005/0089173 A1; and
  Patent No. WO2013116928A1 that describes the Verifiable Identity Based Encryption Protocol in which a method for sending encrypted messages over possible unsecured channels is developed.

The security of identity-based cryptosystems depends on the security of the cryptographic functions implemented to determine the private keys, on the secrecy of the information stored at the trusted center (e.g. the master secret key, the private keys of the users), the identity checks performed by the trusted center before delivering private keys to the users based on their identity information, and on the actions taken by the users to safely hold their private keys and prevent their loss, duplication, or unauthorized access/use.

Further, in existing identity-based encryption schemes, only users that are connected/depend to/on a same trusted center can communicate. If two users, a sender and a recipient are connected to two different trusted centers, the trusted centers are required to share the same master secret key or the sender is required to authenticate himself to the recipient trusted center, i.e. the trusted center to which the recipient is connected.

There is accordingly a need for developing secure identity-based encryption cryptosystems enabling users that are connected to different trusted centers with different master secret keys to securely exchange data.

SUMMARY

In order to address these and other problems, there is provided a transmitter device for sending an encrypted message to a receiver device in an identity-based cryptosystem. The identity-based cryptosystem comprises a transmitter trusted center connected to the transmitter device and a receiver trusted center connected to the receiver device. The transmitter device is configured to:

receive, from the transmitter trusted center, two public authentication keys;

check if a set of conditions related to a transmitter trusted center public key, to a receiver trusted center public key, and to a transmitter authentication key comprised in the two public authentication keys are satisfied;

determine a ciphertext set comprising an encrypted message if the set of conditions are satisfied; and send the ciphertext set to the receiver device.

According to some embodiments, the transmitter trusted center may be associated with a transmitter trusted center identifier, the transmitter device being configured to receive, from the transmitter trusted center, transmitter system parameters, a transmitter public key, and a transmitter private key, the transmitter system parameters comprising a prime number, two algebraic groups of order equal to the prime number, an admissible bilinear map, a first cryptographic hash function, a second cryptographic hash function, a third cryptographic hash function, and a transmitter trusted center public key associated with the transmitter trusted center identifier. The transmitter system parameters may be dependent on the transmitter trusted center identifier and a transmitter trusted center security parameter held by the transmitter trusted center, the transmitter private key being dependent on the transmitter system parameters, a transmitter identifier associated with the transmitter device, and on a transmitter trusted center master key held by the transmitter trusted center.

According to some embodiments, the transmitter device may be configured to verify a transmitter trusted center public key by comparing a first value to a second value, the first value being determined by applying the bilinear map to the transmitter private key and the transmitter trusted center public key, the second value being determined by applying the bilinear map to the transmitter public key and an intermediate transmitter trusted center public key received from the receiver trusted center. The transmitter device may be configured to verify the transmitter authentication key by comparing a third value to a fourth value, the third value being determined by applying the bilinear map to the transmitter trusted center public key and the transmitter authentication key, the fourth value may be determined by applying the bilinear map to the intermediate transmitter trusted center public key and a receiver trusted center public key received from the receiver trusted center.

According to some embodiments, the ciphertext set may further comprise a first component, a second component, and a third component, the transmitter device being configured to:

determine a random secret key;

determine a receiver public key by applying the first cryptographic hash function to a receiver identifier associated with the receiver device, and determine an auxiliary value by applying the third cryptographic hash function to the random secret value and a given message.

According to some embodiments, the transmitter device may be further configured to:

determine the first component by applying an exponentiation function of a basis equal to a receiver trusted center public key received from the receiver trusted center and an exponent equal to the auxiliary value;

determine the second component by applying an addition operation to the random secret key and the output of the application of the second cryptographic hash function to the output of the application of the bilinear map to a first input and a second input, the first input being given by a receiver public key associated with the receiver device to the power the auxiliary value, the second input being given by the output of the application of the first cryptographic hash function to the recipient trusted center identifier associated with the receiver trusted center;

determine an encrypted message by applying a cipher to the a given message, the cipher using the random secret key as encryption key;

determine the third component by applying the second cryptographic hash function to the output of the product between a first input and a second input to the power the auxiliary value, the first input being given by the output of the application of the bilinear map to the transmitter private key and an intermediate transmitter trusted center public key received from the receiver trusted center, the second input being given by the output of the application of the bilinear map to an intermediate receiver trusted center public key received from the receiver trusted center and to a receiver public key associated with the receiver device.

There is also provided a receiver device for receiving, from a transmitter device associated with a transmitter identifier, an encrypted message comprised in a ciphertext set, the ciphertext set comprising a first component, a second component, and a third component. The receiver device may be associated with a receiver identifier. The receiver device may be configured to receive, from a receiver trusted center a receiver public key and a receiver private key, the receiver trusted center being associated with a receiver trusted center identifier, the receiver device being configured to:

apply a first cryptographic hash function to the transmitter identifier, which provides a transmitter public key;

determine a secret key from the first component, the second component and the receiver private key.

The receiver device may be configured to decrypt the encoded message using a decipher that uses a secret key as a decryption key.

According to some embodiments, the receiver device may be further configured to receive, from the receiver trusted center, receiver system parameters, the receiver system parameters comprising a prime number, two algebraic groups of order equal to said prime number, an admissible bilinear map, a first cryptographic hash function, a second cryptographic hash function, a third cryptographic hash function, and a receiver trusted center public key associated with the receiver trusted center identifier, the receiver system parameters being dependent on the receiver trusted center identifier and a receiver trusted center security parameter held by the receiver trusted center, the receiver private key being dependent on the receiver system parameters, the receiver identifier associated with the receiver device, and on a receiver trusted center master key held by the receiver trusted center.

According to some embodiments, the receiver device may be configured to:
verify a receiver trusted center public key by comparing the output of the application of the bilinear map to the receiver private key and the receiver trusted center public key to the output of the bilinear map applied to a receiver public key and to an intermediate receiver trusted center public key received from the receiver trusted center;
verify a receiver authentication key received from the transmitter trusted center and a transmitter trusted center public key by comparing the output of the bilinear map applied to the receiver trusted center public key and to the receiver authentication key with the output of the of the bilinear map applied to the intermediate receiver trusted center public key and to a transmitter trusted center public key, received from the transmitter trusted center; and
verify a transmitter authentication key received from the transmitter trusted center by comparing:
the output of the bilinear map applied to a transmitter trusted center public key and the transmitter authentication key; with
the output of the bilinear map applied to an intermediate transmitter trusted center public key received from the receiver trusted center and to a receiver trusted center public key.

According to some embodiments, the receiver device may be configured to decrypt the encoded message if the receiver trusted center public key, the receiver authentication key, and the transmitter authentication key are verified. The determination of the secret key may comprise applying a subtraction operation between the second component comprised in the ciphertext set and the output of the application of the second cryptographic hash function to the result of the bilinear map applied to the receiver private key and to the first component comprised in the ciphertext set, the receiver device being further configured to:
determine an auxiliary value by applying the third cryptographic hash function to said secret key and the original message, and
verify the transmitter identity by comparing the third component comprised in the ciphertext set to the output of the application of the second cryptographic hash function to a value to the power the auxiliary value.

According to some embodiments, the second cryptographic hash function may be applied to the value determined as the product between:
the output of the bilinear map applied to the transmitter public key and to the intermediate transmitter trusted center public key, and
the output of the bilinear map applied to the transmitter authentication key and to the receiver private key.

There is also provided an identity-based cryptosystem comprising a transmitter trusted center and a receiver trusted center. The transmitter trusted center may be configured to receive, from a transmitter, a transmitter identifier, and to determine a transmitter private key from a transmitter trusted center master key, transmitter system parameters and the transmitter identifier, the transmitter trusted center being configured to determine a transmitter public key by applying a first hash function to the transmitter identifier and to determine a transmitter private key by applying an exponentiation function defined by a base and an exponent, the base being equal to the transmitter public key, and the exponent being equal to the inverse of the transmitter trusted center master key, transmitter trusted center being configured to transmit the transmitter private key to the transmitter device.

According to some embodiments, the receiver trusted center may be configured to receive, from a receiver device, a receiver identifier, and to determine a receiver private key from a receiver trusted center master key, receiver system parameters and a receiver identifier, the receiver trusted center being configured to determine a receiver public key by applying the first hash function to the receiver identifier and to determine the receiver private key by applying an exponentiation function defined by a base and an exponent, the base being equal to the receiver public key, and the exponent being equal to the inverse of the receiver trusted center master key.

According to some embodiments, the transmitter trusted center may be associated with a transmitter trusted center identifier and may hold a transmitter trusted center security parameter, the transmitter trusted center being configured to determine the transmitter system parameters and the transmitter trusted center master key from the transmitter trusted center security parameter and the transmitter trusted center identifier, the transmitter system parameters comprising a prime number, two algebraic groups of order equal to the prime number, an admissible bilinear map, a first cryptographic hash function, a second cryptographic hash function, a third cryptographic hash function, and a transmitter trusted center public key associated with the transmitter trusted center identifier.

According to some embodiments, the receiver trusted center may be associated with a receiver trusted center identifier and may hold a receiver trusted center security parameter, the receiver trusted center being configured to determine the receiver system parameters and the receiver trusted center master key from the receiver trusted center security parameter and the receiver trusted center identifier, the receiver system parameters comprising a prime number, two algebraic groups of order equal to the prime number, an admissible bilinear map, a first cryptographic hash function, a second cryptographic hash function, a third cryptographic hash function, and a receiver trusted center public key associated with the receiver trusted center identifier.

According to some embodiments, the transmitter trusted center may be configured to:
generate the prime number, the two algebraic groups and the admissible bilinear map by running a Bilinear Diffie-Hellman parameter generator that takes as input the transmitter trusted center security parameter;
select the first cryptographic hash function, the second cryptographic hash function, and the third cryptographic hash function from a predefined set of cryptographic hash functions;
determine a first value by applying the first cryptographic hash function to the transmitter trusted center identifier;
randomly select a transmitter trusted center master key; and
determine the transmitter trusted center public key by applying an exponentiation function defined by a base and an exponent, the base being equal to the first value, and the exponent being equal to the transmitter trusted center master key.

According to some embodiments, the receiver trusted center may be configured to:

generate the prime number, the two algebraic groups and the admissible bilinear map by running a Bilinear Diffie-Hellman parameter generator that takes as input the receiver trusted center security parameter;

select the first cryptographic hash function, the second cryptographic hash function, and the third cryptographic hash function from a predefined set of cryptographic hash functions;

determine a first value by applying the first cryptographic hash function to the receiver trusted center identifier;

randomly select a receiver trusted center master key; and determine the receiver trusted center public key by applying an exponentiation function defined by a base and an exponent, the base being equal to the first value, and the exponent being equal to said receiver trusted center master key.

According to some embodiments, the receiver trusted center may be configured to receive, from the transmitter trusted center, a transmitter trusted center identifier, and to determine the transmitter trusted center private key from the receiver trusted center master key, the receiver system parameters and the transmitter trusted center identifier, the receiver trusted center being configured to determine an intermediate transmitter trusted center public key by applying the first hash function to the transmitter trusted center identifier and to determine the transmitter trusted center private key by applying an exponentiation function defined by a base and an exponent, the base being equal to the intermediate transmitter trusted center public key, and the exponent being equal to the inverse of the receiver trusted center master key.

According to some embodiments, the transmitter trusted center may be configured to determine two public authentication keys comprising a transmitter authentication key and a receiver authentication key from the transmitter trusted center master key, the transmitter trusted center private key, and the receiver trusted center public key, the transmitter trusted center being configured to determine the transmitter authentication key by applying an exponentiation function of a base equal to the transmitter trusted center public key and an exponent equal to the inverse of said transmitter trusted center master key, and to determine the receiver authentication key by applying an exponentiation function of a base equal to the transmitter trusted center private key and an exponent equal to the transmitter trusted center master key.

Advantageously, the embodiments of the invention enable a secure exchange between two users that are connected to different trusted centers, the trusted centers can have different master secret keys and the sender does not need to connect to the recipient trusted center to which the recipient is connected.

Advantageously, the embodiments of the invention enable an exchange of trust between the sender and the recipient without connecting the sender and the recipient to the trusted centers.

The embodiments of the invention further provide an identity-based encryption scheme that does not require use of certificates and require a reduced number of authentication operations compared with existing schemes.

Advantageously, the identity-based cryptosystem according to the embodiments of the invention also provide and guarantee data confidentiality between the users and authentication of the users that the identity of each sender and each recipient can be verified.

Further advantages of the present invention will become clear to the skilled person upon examination of the drawings and detailed description. It is intended that any additional advantages be incorporated herein.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the invention provide devices and methods for secured, confidential, and authenticated exchange of messages between a pair of users, comprising a sender (also referred to herein as a 'transmitter', 'sender device', or 'transmitter device') and a recipient (also referred to hereinafter as a 'receiver', a 'recipient device', or a 'receiver device'), in an identity-based encryption cryptosystem (also referred to as a 'cryptographic system').

Figure 1:
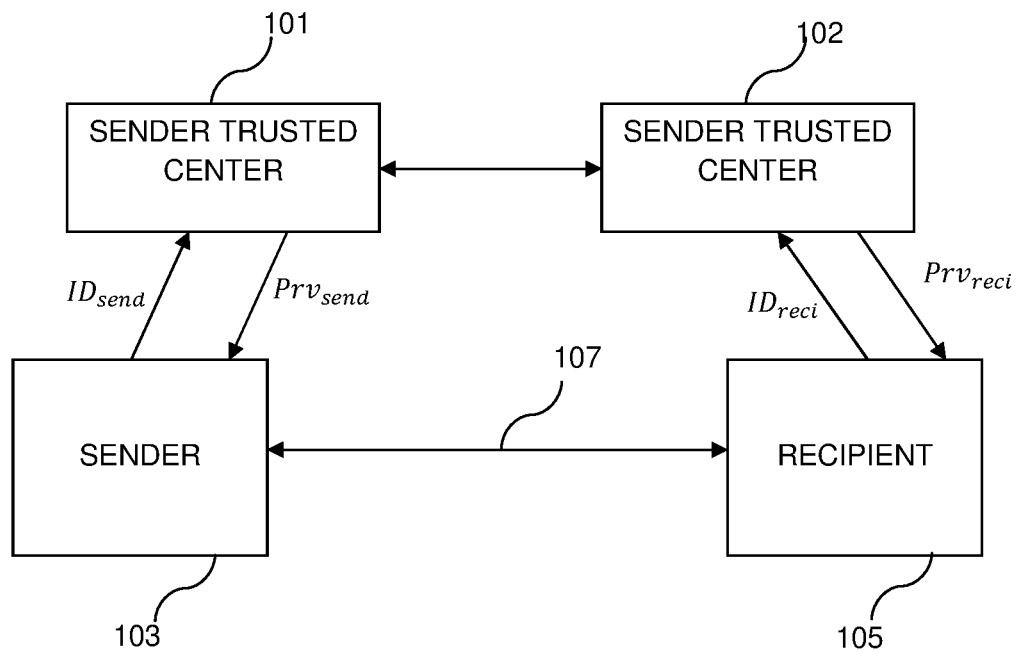
FIG. 1 is a schematic diagram of an exemplary implementation of the invention in a cryptosystem 100.

Referring to FIG. 1, there is shown a cryptosystem 100 in which the embodiments of the invention may be applied. The cryptosystem 100 may comprise a sender 103 and a recipient 105 connected via a link 107, a sender trusted center 101 (also referred to hereinafter as a 'transmitter trusted center') connected to the sender 103, and a recipient trusted center 102 (also referred to hereinafter as a 'receiver trusted center') connected to the recipient 105. The sender trusted center 101 and the recipient trusted center 102 are different entities such that the sender 103 cannot connect the recipient trusted center 102 and the recipient 105 cannot connect the sender trusted center 101. The following description of some embodiments of the invention will be made hereinafter with reference to two trusted centers (a sender trusted center and a recipient trusted center), for illustration purposes only. However, the skilled person will readily understand that the embodiments of the invention may be applied to cryptosystems involving three or more trusted centers.

The sender 103 and the recipient 105 may be any user, user device, equipment, object, entity, configured to operate in the cryptosystem 100. More specifically, the sender 103 may be any user device, user equipment, user object, or user apparatus configured or configurable to determine an encrypted message from original data and to transmit the encrypted message to the recipient 105. The recipient 105 may be any user device, user equipment, user object or user apparatus configured or configurable to receive the encrypted message transmitted over the link 107 and to decrypt the encrypted message to recover original data. It should be noted that in the figures, the sender 103 and the recipient 105 are labeled according to the direction of transmission and reception of encrypted messages. However, in practice, the sender 103 and the recipient 105 may be any transceivers devices capable of transmitting and receiving data in any cryptosystem 100.

In some embodiments, the sender 103 and the recipient 105 may be any cryptographic device that implement hardware and/or software cryptographic functions for ensuring data and/or signals security, encryption, authentication, protection, and privacy. As used herein, a 'cryptographic device' encompass any device, computer, computing machine, or embedded system, programmed and/or programmable to perform cryptographic functions for the generation and the use of cryptographic keys. Exemplary cryptographic devices include, without limitation:
- smartcards, tokens to store keys such as wallets, smartcards readers such as Automated Teller Machines (ATM) used for example in financial transactions, restricted access, telecommunications, military applications, secure communication equipments, and TV set-top boxes;
- electrical and digital electronic devices such as RFID tags and electronic keys;
- embedded secure elements (e.g. smart-cards, Trusted Platform Module (TPM) chip);
- computers (e.g. desktop computers and laptops), tablets; routers, switches, printers;
- mobile phones such as smartphones, base stations, relay stations, satellites;
- Internet of Thing (IoT) devices (used for example in smart-cities, smart-cars applications), robots, drones; and
- recorders, multimedia players, mobile storage devices (e.g. memory cards and hard discs) with logon access monitored by cryptographic mechanisms.

The embodiments of the invention may be implemented in a cryptosystem 100, which may be used in various applications such as in storage, information processing, or communication systems.

For example, in an application of the invention to storage systems, the cryptosystem 100 may represent a storage system, infrastructure or network, the sender 103 and/or the recipient 105 being part of such cryptosystem and comprising one or more storage devices configured to store or use encrypted data (e.g. memory cards or hard discs).

In an application of the invention to information processing, the cryptosystem 100 may be for example a computer system (e.g. a small or large area wired or wireless access network), a database, an online sale system or a financial system comprising a sender 103 and a recipient 105 configured to secure the data used and/or stored in the system (such as personal financial or medical data).

In an application of the invention to communication systems, the cryptosystem 100 may be wired/wireless/optical/radio communication network in which at least one sender 103 is configured to transmit, over a medium 107 that can be unsecure, encrypted data to at least one recipient 105.

Original data may correspond to text files, video, audio, or any other media data.

The sender 103 and/or the recipient 105 may be fixed, such as a computer operating in a wired communication system, or mobile, such as a user terminal operating in a radio or wireless network.

The link 107 may correspond to a network (e.g. Internet-based network, computer network) or to any communication medium (wired, wireless, or optical).

The sender 103 may be configured to select the sender trusted center 101 in the cryptosystem 100 and to identify the sender and recipient trusted centers by their identity information. The sender 103 may be further configured to select the recipient 105 among the users of the cryptosystem 100. The recipient 105 may be configured to select the recipient trusted center 102 in the cryptosystem 100 and to identify the sender and recipient trusted centers by their identity information.

The sender trusted center 101 may be connected to the sender 103 and the recipient trusted center 102 may be connected to the recipient 105. The sender trusted center 101 and/or the recipient trusted center 102 may be a device, an entity, or a system such as an organization (e.g. a social public organization, headquarters of a corporation, smart-cities regional authorities, smart-cars national authorities) configured or configurable to generate private keys associated with the identity information of the users when they join the cryptosystem 100.

According to some embodiments, the sender trusted center 101 and/or the recipient trusted center 102 may be a system administrator, a dedicated server, or a server that is part of a distributed network. The sender trusted center 101 and the recipient trusted center 102 according to the invention may collaborate to exchange data to be used by the sender 103 and the recipient 105 for exchange of trust.

Each user in the cryptosystem 100 may be associated with an identity information, also referred to as 'an identifier', that uniquely identifies the user in the cryptosystem 100. In some embodiments, an identifier may be one or a combination of two or more identifiers chosen in a group comprising an identity sequence, a name, a username, a network address, a social security number, a street address, an office number, a telephone number, an electronic mail address associated with a user, a date, an Internet Protocol address belonging to a network host. An identifier associated with each user may be any public, cryptographically unconstrained string that is used in conjunction with public data of the trusted center 101 to perform data encryption or signing.

In the following description of some embodiments, the identity information associated with the sender 103 will be also referred to as the 'sender identifier' or 'transmitter identifier', the identity information associated with the recipient 105 will be referred to as the 'recipient identifier' or 'receiver identifier', the identity information associated with the sender trusted center 101 will be also referred to as the 'sender trusted center identifier', and the identity information associated with the recipient trusted center 102 will be also referred to as the 'recipient trusted center identifier'.

Each of the sender identifier, the recipient identifier, the sender trusted center identifier, and the recipient trusted center identifier may be strings that belong to the set $\{0,1\}^*$.

In order to facilitate the understanding of the various embodiments of the invention, the following definitions are provided:

$n \in \mathbb{N}$ designates a non-zero natural number;

$\lambda_s \in \mathbb{Z}^+$ is a positive value integer number designating a sender trusted center security parameter (also referred to as a 'transmitter trusted center security parameter');

$\lambda_r \in \mathbb{Z}^+$ is a positive value integer number designating a recipient trusted center security parameter (also referred to as a 'receiver trusted center security parameter');

$p \in \mathbb{N}$ designates a prime number;

$\mathbb{F}_2 = \mathbb{Z}/2\mathbb{Z}$ designates a Euclidean domain (also called a Euclidean ring) and $\mathbb{F}_2[x]$ designates the ring of polynomials having coefficients that belong to the Euclidean ring $\mathbb{F}_2$;

$G$ and $G_T$ designate two groups of order p;

$e: G \times G \rightarrow G_T$ designates a bilinear map;

$H_1: \{0,1\}^n \rightarrow G$ designates a first cryptographic hash function;

$H_2: G_T \rightarrow \{0,1\}^n$ designates a second cryptographic hash function;

$H_2: \{0,1\}^n \times \{0,1\}^n \rightarrow \mathbb{Z}_p^n$ designates a third cryptographic hash function;

$\mathcal{M} = \{0,1\}^n$ represents a finite message space, i.e. the space to which belongs each message (also referred to as an 'original message' or a 'plaintext message', or a 'plaintext');

$M \in \mathcal{M}$ designates a plaintext message;

$\mathcal{C} = G^* \times \{0,1\}^n$ represents a finite ciphertext space, i.e. the space to which belongs each encrypted message (also referred to as a 'ciphertext' or a 'ciphertext message');

$C(M) \in \mathcal{C}$ designates a ciphertext message computed by encrypting the plaintext message M;

$ID_{TC_s}$ refers to the sender trusted center identifier (also referred to as 'transmitter trusted center identifier');

$ID_{TC_r}$ refers to the recipient trusted center identifier (also referred to as 'receiver trusted center identifier');

$ID_{send}$ refers to the sender identifier;

$ID_{reci}$ refers to the recipient identifier;

$g_{pub_s}$ refers to a sender trusted center public key (also referred to as a 'transmitter trusted center public key');

$g_{pub_r}$ refers to a recipient trusted center public key (also referred to as a 'receiver trusted center public key');

$g_{ID_{TC_s}}$ refers to an intermediate sender trusted center public key (also referred to as 'an intermediate transmitter trusted center public key');

$g_{ID_{TC_r}}$ refers to an intermediate recipient trusted center public key (also referred to as an 'intermediate receiver trusted center public key');

$g_{send}$ refers to a sender public key (also referred to as a 'transmitter public key');

$g_{reci}$ refers to a recipient public key (also referred to as a 'receiver public key');

$Prv_{send}$ refers to a sender private key (also referred to as a 'transmitter private key') associated with the sender public key $g_{send}$ and sender identifier $ID_{send}$;

$Prv_{reci}$ refers to a recipient private key (also referred to as a 'receiver private key') associated with the recipient public key $g_{reci}$ and recipient identifier $ID_{reci}$;

$Prv_{ID_{TC_s}}$ refers to a sender trusted center private key associated with the sender trusted center identifier $ID_{TC_s}$;

$PK_s$ refer to sender system parameters (also referred to as 'transmitter system parameters') determined by the sender trusted center 101;

$PK_r$ refer to recipient system parameters (also referred to as 'receiver system parameters') determined by the recipient trusted center 102;

$s_s$ refers to a sender trusted center master key (also referred to as a 'transmitter trusted center master key');

$s_r$ refers to a recipient trusted center master key (also referred to as a 'receiver trusted center master key');

$et_{auth_s}$ refers to a sender authentication key (also referred to as a 'transmitter authentication key');

$et_{auth_r}$ refers to a recipient authentication key (also referred to as a 'receiver authentication key');

$E_\sigma(\cdot)$ designates a cipher (also referred to as a 'ciphertext algorithm') that uses a cryptographic key σ as encryption key and $D_\sigma(\cdot)$ designates the decipher associated with the cipher $E_\sigma(\cdot)$ such that a message encrypted using the cipher $E_\sigma(\cdot)$ is successfully recovered only if it is decrypted with the decipher $D_\sigma(\cdot)$ that uses the cryptographic key σ as a decryption key. The cipher is symmetric.

The embodiments of the invention provide a sender 103 operable to transmit an encrypted message C(M) to a recipient 105 in an identity-based cryptosystem 100 that comprises a sender trusted center 101 connected to the sender 103 and a recipient trusted center 102 connected to the recipient 105, the sender 103 and the recipient 105 being configured to communicate over the link 107 securely, independently, and without accessing the sender trusted center 101 and the recipient trusted center 102. Accordingly, the transmission of encrypted messages from the sender 103 to the recipient 105 may be completed without contacting the sender trusted center 101 and the recipient trusted center 102. In the identity-based cryptosystem 100, the sender 103 is associated with a sender identifier $ID_{send}$, the recipient is associated with a recipient identifier $ID_{reci}$, the sender trusted center is associated with a sender trusted center identifier $ID_{TC_s}$, and the recipient trusted center is associated with a recipient trusted center identifier $ID_{TC_r}$. The different identifiers may be publically known, i.e. known to the sender 103, the recipient 105, the sender trusted center 101, and the recipient trusted center 102.

The sender trusted center 101 may be configured to manage the generation and distribution of the sender private key. Accordingly, the sender trusted center 101 may be configured to receive the sender identifier $ID_{send}$ from the sender 103 and to determine a sender private key $Prv_{send}$ from the sender identifier $ID_{send}$.

Similarly, the recipient trusted center 102 may be configured to manage the generation and distribution of the recipient private key. Accordingly, the recipient trusted center 102 may be configured to receive the recipient identifier $ID_{reci}$ from the recipient 105 and to determine a recipient partial private key $Prv_{reci}$ from the recipient identifier $ID_{reci}$.

The sender trusted center 101 may be further configured to send the sender private key to the sender 103. The recipient trusted center 102 may be configured to send the recipient private key to the recipient 105. Once the sender trusted center 101 and the recipient trusted center 102 delivered the private keys to the sender 103 and the recipient 105, the sender private key and the recipient private key may not need to be updated, for example if new users join the cryptosystem 100.

According to the embodiments of the invention, the sender 103 is configured to send the encrypted message to the recipient 105 securely using an authentication of the sender trusted center through the use of two authentication keys.

Accordingly, the sender 103 may be configured to receive, from the sender trusted center 101, two public authentication keys $et_{auths}$ and $et_{authr}$. The sender trusted center 101 may be configured to determine at least one of the two public authentication keys from a sender trusted center private key $$Prv_{ID_{TC_s}}$$

previously determined at the recipient trusted center 102 from the sender trusted center identifier $ID_{TC_s}$ associated with the sender trusted center 101.

The two public authentication keys comprise a sender authentication key $et_{auths}$ and a recipient authentication key $et_{authr}$. The sender authentication key may be used for the exchange of trust, i.e. for the sender authentication and the verification of a recipient trusted center public key. The recipient authentication key may be used at the recipient for the authentication of the sender authentication key. Key verification enables matching the key to a person/entity.

Upon reception of the two public authentication keys, the sender 103 may be configured to verify a sender trusted center public key $g_{pub_s}$, a recipient trusted center public key $g_{pub_r}$, and the sender authentication key $et_{auths}$.

If the sender 103 succeeds the verifications of the sender trusted center public key, the recipient trusted center public key, and the sender authentication key, the sender 103 may be configured to determine a ciphertext set $C_1$ comprising an encrypted message $C(M)$.

The sender 103 may then send the ciphertext set to the recipient 105, the recipient 105 being configured to receive the ciphertext set and to recover an original message by decrypting the encrypted message.

The sender trusted center 101 has secret information that enables it to compute the sender private key of the sender 103. More specifically, the sender trusted center 101 may be configured to hold a sender trusted center security parameter denoted by $\lambda_s \in \mathbb{Z}^+$ and a sender trusted center identifier $ID_{TC_s}$ and to generate sender system parameters $PK_s$ and a sender trusted center master key $s_s$ from the sender security parameter $\lambda_s$ and the sender trusted center identifier $ID_{TC_s}$. The sender system parameters denoted by $PK_s = \{p, G, G_T, e, H_1, H_2, H_3, g_{pub_s}\}$ comprise a prime number p, two algebraic groups G and $G_T$ of order equal to the prime number p, an admissible bilinear map e, a first cryptographic hash function $H_1$, a second cryptographic hash function $H_2$, a third cryptographic hash function $H_3$, and a sender trusted center public key $g_{pub_s}$ associated with the sender trusted center identifier $ID_{TC_s}$.

When computed, the sender trusted center 101 makes the sender system parameters known publicly, i.e. to all the users in the cryptosystem including the sender 103, the recipient 105, and the recipient trusted center 102. The sender trusted center 101 keeps, however, the sender trusted center master key $s_s$ private and known only to the sender trusted center 101.

The sender trusted center security parameter $\lambda_s$ is used to determine the sender system parameters and the sender trusted center master key. In particular, the sender trusted center security parameter may allow to determine the size, in bits, of the sender trusted center master key such that $s_s \in \mathbb{Z}_p^n$, with n being a non-zero natural number. The sender trusted center security parameter may be also used to determine the size of the prime number in bits. For example, the prime number may be selected to be a random $\lambda_s$-bits prime number.

According to some embodiments, the bilinear map e may be based on a Weil pairing or a Tate pairing defined on a subgroup of an elliptic curve. In such embodiments, the elements of the algebraic group G may be points on an elliptic curve.

According to some embodiments, the sender trusted center 101 may be configured to determine the sender system parameters $PK_s$ and the sender trusted center master key by applying a setup algorithm that takes as input the sender trusted center security parameter $\lambda_s$ and the sender trusted center identifier $ID_{TC_s}$ and returns as outputs the sender system parameters $PK_s$ and a sender trusted center master key $s_s$. According to the setup algorithm, the sender trusted center 101 may be configured to generate a prime number p, the two algebraic groups G and $G_T$ and an admissible bilinear map e by running a Bilinear Diffie-Hellman parameter generator that takes as input the sender trusted center security parameter $\lambda_s$ and outputs a prime number p, the description of two groups G and $G_T$ and the description of an admissible bilinear map e: $G \times G \to G_T$.

Given the sender trusted center security parameter, the sender trusted center 101 may be configured to select, among a predefined set of cryptographic hash functions, a first cryptographic hash function $H_1: \{0,1\}^n \to G$, a second cryptographic hash function $H_2: G_T \to \{0,1\}^n$, and a third cryptographic hash function $H_3: \{0,1\}^n \times \{0,1\}^n \to \mathbb{Z}_p^n$. The cryptographic hash function $H_1$, $H_2$ and $H_3$ may be random oracles.

The sender trusted center 101 may be then configured to determine a first value denoted by g by applying the first cryptographic hash function $H_1$ to the sender trusted center identifier $ID_{TC_s}$ such that $g = H_1(ID_{TC_s})$.

The sender trusted center 101 may be further configured to randomly select a sender trusted center master secret key $s_s \in \mathbb{Z}_p^+$; and to determine a sender trusted center public key $g_{pub_s}$ by applying an exponentiation function defined by a base and an exponent, the base being equal to the first value $g1=H_1(ID_{TC_s})$, and the exponent being equal to the sender trusted center master key $s_s$ such that $g_{pub_s}=g1^{s_s}$. The exponentiation function may be replaced with a scalar multiplication function according to which $g_{pub_s}=[s_s]g1$ if the first value corresponds to a point of an elliptic curve.

The recipient trusted center 102 has secret information that enables it to compute the recipient private key of the recipient 103 and the sender trusted center private key. More specifically, the recipient trusted center 102 may be configured to hold a recipient trusted center security parameter denoted by $\lambda_r \in \mathbb{Z}^+$, a recipient trusted center identifier $ID_{TC_r}$, to generate recipient system parameters $PK_r$, a recipient trusted center master key $s_r$ from the recipient trusted center security parameter A, and the recipient trusted center identifier $ID_{TC_r}$. The recipient system parameters denoted by $PK_r=\{p, G, G_T, e, H_1, H_2, H_3, g_{pub_r}\}$ comprise a prime number p, two algebraic groups G and $G_T$ of order equal to the prime number p, an admissible bilinear map e, a first cryptographic hash function $H_1$, a second cryptographic hash function $H_2$, a third cryptographic hash function $H_3$, and a recipient trusted center public key $g_{pub_r}$ associated with the recipient trusted center identifier $ID_{TC_r}$.

When computed, the recipient trusted center 102 makes the recipient system parameters known publicly, i.e. to all the users in the cryptosystem including the sender 103, the recipient 105, and the sender trusted center 101. The recipient trusted center 102 keeps, however, the recipient trusted center master key $s_r$ private and known only to the recipient trusted center 102.

The recipient trusted center security parameter A, is used to determine the recipient system parameters and the recipient trusted center master key. In particular, the recipient trusted center security parameter may allow to determine the size, in bits, of the recipient trusted center master key such that $s_r \in \mathbb{Z}_p^n$, with n being a non-zero natural number. The recipient trusted center security parameter may be also used to determine the size of the prime number in bits. For example, the prime number may be selected to be a random $\lambda_r$-bit prime number.

According to some embodiments, the recipient trusted center 102 may be configured to determine the recipient system parameters $PK_r$ and the recipient trusted center master key by applying a setup algorithm that takes as input the recipient trusted center security parameter $\lambda_r$, and the recipient trusted center identifier $ID_{TC_r}$ and returns as outputs the recipient system parameters $PK_r$ and a recipient trusted center master key $s_r$. According to the setup algorithm, the recipient trusted center 102 may be configured to generate a prime number p, the two algebraic groups G and $G_T$ and an admissible bilinear map e by running a Bilinear Diffie-Hellman parameter generator that takes as input the recipient trusted center security parameter $\lambda_r$ and outputs a prime number p, the description of two groups G and $G_T$ and the description of an admissible bilinear map e: $G \times G \to G_T$.

Given the recipient trusted center security parameter, the recipient trusted center 102 may be configured to select, among a predefined set of cryptographic hash functions, a first cryptographic hash function $H_1: \{0,1\}^n \to G$, a second cryptographic hash function $H_2: G_T \to \{0,1\}^n$, and a third cryptographic hash function $H_3: \{0,1\}^n \times \{0,1\}^n \to \mathbb{Z}_p^n$. The cryptographic hash function $H_1$, $H_2$ and $H_3$ may be random oracles.

The recipient trusted center 102 may be then configured to determine a value denoted by g by applying the first cryptographic hash function $H_1$ to the recipient trusted center identifier $ID_{TC_r}$ such that $g=H_1(ID_{TC_r})$.

The recipient trusted center 102 may be further configured to randomly select a recipient trusted center master secret key $s_r \in \mathbb{Z}_p^+$ and to determine a recipient trusted center public key $g_{pub_r}$ by applying an exponentiation function defined by a base and an exponent, the base being equal to the value $g=H_1(ID_{TC_r})$, and the exponent being equal to the recipient trusted center master key $s_r$ such that $g_{pub_r}=g^{s_r}$. The exponentiation function may be replaced by a scalar multiplication function according to which $g_{pub_r}=[s_r]g$ if the value g corresponds to a point of an elliptic curve.

A large part of the system parameters comprised in the sender system parameters and the recipient system parameters may coincide. In particular, according to some embodiments, the sender system parameters and the recipient system parameters may satisfy $PK_s \backslash \{g_{pub_s}\}=\{p, G, G_T, e, H_1, H_2, H_3\}=PK_r \backslash \{g_{pub_r}\}-\{p, G, G_T, e, H_1, H_2, H_3\}$.

According to some embodiments, the sender 103 may send the sender identifier $ID_{send}$ to the sender trusted center 101 and ask it to receive the sender private key $Prv_{send}$.

Upon reception of the request sent by the sender 103, the sender trusted center 101 may be configured to determine the sender private key from the sender trusted center master key $s_s$, the sender system parameters $PK_s$, and the sender identifier $ID_{send}$ by applying a KeyGen algorithm that takes as input the sender trusted center master secret key, the sender identifier, and the sender system parameters, and outputs the sender private key.

Accordingly, the sender trusted center 101 may be configured to determine a sender public key $g_{send}$ by applying the first hash function $H_1$ to the sender identifier $ID_{send}$ such that $g_{send}=H_1(ID_{send})$ and to determine the sender private key $Prv_{send}$ by applying an exponentiation function defined by a base and an exponent, the base being equal to the sender public key $g_{send}$ and the exponent being equal to the inverse of the sender trusted center master secret key $$\frac{1}{s_s}$$

such that $$Prv_{send} = g_{send}^{\frac{1}{s_s}}.$$

The exponentiation function may be replaced by a scalar multiplication function such that $$Prv_{send} = \left[\frac{1}{s_s}\right] g_{send}$$

if the sender public key corresponds to a point of an elliptic curve.

According to some embodiments, the recipient 105 may send the recipient identifier $ID_{reci}$ to the recipient trusted center 102 and ask it to receive the recipient private key $Prv_{reci}$.

Upon reception of the request sent by the recipient 105, the recipient trusted center 102 may be configured to determine the recipient private key from the recipient trusted center master key $s_r$, the recipient system parameters $PK_r$, and the recipient identifier $ID_{reci}$ by applying a KeyGen algorithm that takes as input the recipient trusted center master secret key, the recipient identifier, and the recipient system parameters, and outputs the recipient private key.

Accordingly, the recipient trusted center 102 may configured to determine a recipient public key $g_{reci}$ by applying the first hash function $H_1$ to the recipient identifier $ID_{reci}$ such that $g_{reci} = H_1(ID_{reci})$ and to determine the recipient private key $Prv_{reci}$ by applying an exponentiation function defined by a base and an exponent, the base being equal to the recipient public key $g_{reci}$, and the exponent being equal to the inverse of the recipient trusted center master secret key $$\frac{1}{s_r}$$

such that $$Prv_{reci} = g_{reci}^{\frac{1}{s_r}}.$$

The exponentiation function may be replaced with a scalar multiplication function according to which $$Prv_{reci} = \left[\frac{1}{s_r}\right] g_{reci}$$

if the recipient public key corresponds to a point of an elliptic curve.

According to some embodiments, the sender trusted center 101 may send the sender trusted center identifier $ID_{TC_s}$ to the recipient trusted center 102 and ask it to receive the its sender trusted center private key $$Prv_{TC_s}.$$

Upon reception of the request sent by the sender trusted center 101, the recipient trusted center 102 may be configured to determine the sender trusted center private key from the recipient trusted center master key $s_r$, the recipient system parameters $PK_r$, and the sender trusted center identifier $ID_{TC_s}$ by applying a KeyGen algorithm that takes as input the recipient trusted center master secret key, the sender trusted center identifier, and the recipient system parameters, and outputs the sender trusted center private key.

Accordingly, the recipient trusted center 102 may configured to determine an intermediate sender trusted center public key $$g_{ID_{TC_s}}$$

by applying the first hash function $H_1$ to the sender trusted center identifier $ID_{TC_s}$ such that $$g_{ID_{TC_s}} = H_1(ID_{TC_s})$$

and to determine the sender trusted center private key $$Prv_{TC_s}$$

by applying an exponentiation function defined by a base and an exponent, the base being equal to the intermediate sender trusted center public key $$g_{ID_{TC_s}},$$

and the exponent being equal to the inverse of the recipient trusted center master secret key $$\frac{1}{s_r}$$

such that $$Prv_{TC_s} = g_{ID_{TC_s}}^{\frac{1}{s_r}}.$$

The exponentiation function may be replaced with a scalar multiplication function according to which $$Prv_{TC_s} = \left[\frac{1}{s_r}\right] g_{ID_{TC_s}}$$

if the sender trusted center public key corresponds to a point of an elliptic curve.

According to some embodiments, the sender trusted center 101 may be configured to determine the two public authentication keys from the sender trusted center master key $s_s$, the sender trusted center private key $$Prv_{TC_s},$$

and the recipient trusted center public key $g_{pub_r}$. More specifically, the sender trusted center 101 may be configured to:

determine the sender authentication key $et_{auths}$ by applying an exponentiation function of a base equal to the recipient trusted center public key $g_{pub_r}$ and an exponent equal to the inverse of the sender trusted center master key $s_s$ such that $$et_{auths} = g_{pub_r}^{\frac{1}{s_s}},$$

and
determine the recipient authentication key $et_{authr}$ by applying an exponentiation function of a base equal to the sender trusted center private key $$Prv_{TC_s}$$

and an exponent equal to the sender trusted center master key $s_s$ such that $$et_{authr} = Prv_{TC_s}^{s_s}.$$

In embodiments in which the recipient trusted center public key corresponds to a point of an elliptic curve, the exponentiation function performed to determine the sender authentication key may be replaced with a scalar multiplication such that $$et_{auths} = \left[\frac{1}{s_s}\right] g_{pub_r}.$$

In embodiments in which the sender trusted center private key corresponds to a point of an elliptic curve, the exponentiation function performed to determine the recipient authentication key may be replaced with a scalar multiplication such that $$et_{authr} = [s_s] Prv_{TC_s}.$$

The sender trusted center 101 may be further configured to send the two public authentication keys to the sender 103 and the recipient 105.

According to some embodiments, the sender 103 may be configured to verify a sender trusted center public key by comparing a first value $$e(Prv_{send}, g_{pub_s})$$

to a second value $$e(g_{send}, g_{ID_{TC_s}}),$$

the first value $$e(Prv_{send}, g_{pub_s})$$

being determined by applying the bilinear map e to the sender private key $Prv_{send}$ and the sender trusted center public key $g_{pub_s}$ comprised in the sender system parameters. The second value $$e(g_{send}, g_{ID_{TC_s}})$$

is determined by the sender 103 by applying the bilinear map e to the sender public key $g_{send}$ and the intermediate sender trusted center public key $$g_{ID_{TC_s}}.$$

The sender 103 verifies the sender trusted center public key if the sender 103 determines that $$e(Prv_{send}, g_{pub_s}) = e(g_{send}, g_{ID_{TC_s}}).$$

According to some embodiments, the sender 103 may be configured to verify the sender authentication key $et_{auths}$ by comparing a third value $e(g_{pub_s}, et_{auths})$ to a fourth value $$e(g_{ID_{TC_s}}, g_{pub_r}),$$

the third value $e(g_{pub_s}, et_{auths})$ being determined by applying the bilinear map e to the sender trusted center public key $g_{pub_s}$ and the sender authentication key $et_{auths}$, the fourth value $$e(g_{ID_{YC_s}}, g_{pub_r})$$

being determined by applying the bilinear map e to the intermediate sender trusted center public key $$g_{ID_{TC_s}}$$

and the recipient trusted center public key $g_{pub_r}$ comprised in the recipient system parameters. The sender 103 verifies the sender authentication key if the sender 103 determines that $$e(g_{pub_s}, et_{auths}) = e(g_{ID_{TC_s}}, g_{pub_r}).$$

If the sender 103 succeeds the verification of the sender trusted center public (i.e. if the sender 103 gets $$e(Prv_{send}, g_{pub_s}) = e(g_{send}, g_{ID_{TC_s}}))$$

and the verification of the sender authentication key (i.e. of the sender 103 gets $$e(g_{pub_s}, et_{auths}) = e(g_{ID_{TC_s}}, g_{pub_r})),$$

then the sender 103 may be configured to determine the ciphertext set $C_1=\{V, U, C(M), Y\}$ that comprises, in addition to the encrypted message $C(M)$, a first component denoted by V, a second component denoted by U, and a third component denoted by Y. More specifically, the sender 103 may be configured to:

determine a random secret key σ;

determine a recipient public $g_{reci}$ key by applying the first cryptographic hash function $H_1$ to the recipient identifier $ID_{reci}$ such that $g_{reci}=H(ID_{reci})$;

determine an auxiliary value r by applying the third cryptographic hash function $H_3$ to the random secret value σ and a given message M such that $r=H_3(σ,M)$;

determine the first component V by applying an exponentiation function of a basis equal to the recipient trusted center public key $g_{pub_r}$ comprised in the recipient system parameters and an exponent equal to the auxiliary value, such that $V=g_{pub_r}{}^r$. The exponentiation function may be replaced with a scalar multiplication function such that $V=[r]g_{pub_r}$ in embodiments in which the recipient trusted center public key corresponds to a point of an elliptic curve;

determine the second component U by applying an addition operation to the random secret key σ and the output $H_2(e(g_{reci}{}^r,H_1(ID_{TC_r})))$ of the application of the second cryptographic hash function $H_2$ to the output $e(g_{reci}{}^r, H_1(ID_{TC_r}))$ of the application of the bilinear map e to a first input $g_{reci}{}^r$ and a second input $H_1(ID_{TC_r})$, the first input $g_{reci}{}^r$ being given by the recipient public key $g_{reci}$ to the power the auxiliary value r, the second input $H_1(ID_{TC_r})$ being given by the output of the application of the first cryptographic hash function $H_1$ to the recipient trusted center identifier $ID_{TC_r}$. The second component is accordingly given by $U=σ+H_2(e(g_{reci}{}^r, H_1(ID_{TC_r})))$. The addition operation may be performed over $\mathbb{F}_2[x]$ in which case, the addition operation is an XOR operation;

determine the encrypted message C(M) by applying a cipher $E_σ$ to the given message M, the cipher $E_σ$ using the random secret key σ as encryption key, and determine the third component Y by applying the second cryptographic hash function $H_2$ to the output $$e(Prv_{send}, g_{ID_{TC_s}}) \times e(g_{ID_{TC_r}}, g_{reci})$$

of the product between a first input $$e(Prv_{send}, g_{ID_{TC_s}})$$

and a second input $$e(g_{ID_{TC_r}}, g_{reci})$$

to the power the auxiliary value r, the first input $$e(Prv_{send}, g_{ID_{TC_s}})$$

being the output of the application of the bilinear map e to the sender private key $Prv_{send}$ and the intermediate sender trusted center public key $$g_{ID_{TC_s}}.$$

The second input $$e(g_{ID_{TC_r}}, g_{reci})$$

is the output of the application of the bilinear map e to an intermediate recipient trusted center public key $$g_{ID_{TC_r}}$$

and the recipient public key $g_{reci}$. The third component is accordingly given by $$Y = H_2((e(Prv_{send}, g_{ID_{TC_s}}) \times e(g_{ID_{TC_r}}, g_{reci}))^r).$$

If the sender 103 fails to verify one or both of the sender trusted center public (i.e. if the sender 103 gets $$e(Prv_{send}, g_{pub_s}) \neq e(g_{send}, g_{ID_{TC_s}}))$$

and the verification of the sender authentication key (i.e. if the sender 103 gets $$e(g_{pub_s}, et_{auths}) \neq e(g_{ID_{TC_s}}, g_{pub_r})),$$

then the sender 103 aborts.

Upon reception of the ciphertext set, the recipient 105 may be configured to:

verify a recipient trusted center public key by comparing the output $e(Prv_{reci}, g_{pub_r})$ of the application of the bilinear map e to the recipient private key $Prv_{reci}$ and the recipient trusted center public key $g_{pub_r}$ to the output $$e(g_{reci}, g_{ID_{TC_r}})$$

of the application of the bilinear map e to the recipient public key $g_{reci}$ and the intermediate recipient trusted center public key $$g_{ID_{TC_r}}.$$

The recipient trusted center public key is verified if the recipient 105 determines that $$e(Prv_{reci}, g_{pub_r}) = e(g_{reci}, g_{ID_{TC_r}});$$

verify the recipient authentication key $et_{authr}$ and the sender trusted center public key $g_{pub_s}$ by comparing the output $e(g_{pub_r}, et_{authr})$ of the application of the bilinear map e to the recipient trusted center public key $g_{pub_r}$ comprised in the recipient system parameters and the recipient authentication key $et_{authr}$, to the output $$e(g_{ITTC_r}, g_{pub_s})$$

of the application of the bilinear map e to the intermediate recipient trusted center public key $$g_{ID_{TC_r}}$$

and the sender trusted center public key $g_{pub_s}$. The sender trusted center public key is verified if the recipient 105 determines that $$e(g_{pub_r}, et_{authr}) = e(g_{ID_{TC_r}}, g_{pub_s});$$

and
verify the sender authentication key $et_{auths}$ by comparing the output $e(g_{pub_s}, et_{auths})$ of the application of the bilinear map e to the sender trusted center public key $g_{pub_s}$ and the sender authentication key $et_{auths}$, to the output $$e(g_{ID_{TC_s}}, g_{pub_r})$$

of the application of the bilinear map e to the intermediate sender trusted center public key $$g_{ID_{TC_s}}$$

and the recipient trusted center public key $g_{pub_r}$. The sender authentication key is verified if the recipient 105 determines that $$e(g_{pub_s}, et_{auths}) = e(g_{ID_{TC_s}}, g_{pub_r}).$$

In embodiments in which the verifications of the recipient trusted center public key, the recipient authentication key, the sender trusted center public key, and the sender authentication key succeed (i.e. when $$e(Prv_{reci}, g_{pub_r}) = e(g_{reci}, g_{ID_{TC_r}}) \text{ and } e(g_{pub_r}, et_{cuthr}) =$$
$$e(g_{ID_{TC_r}}, g_{pub_s}) \text{ and } e(g_{pub_s}, et_{auths}) = e(g_{ID_{TC_s}}, g_{pub_r})),$$

the recipient 105 may be configured to:
determine a sender public key $g_{send}$ by applying the first cryptographic hash function $H_1$ to the sender identifier $ID_{send}$ such that $g_{send}=H_1(ID_{send})$;
determine a secret key σ by applying a subtraction operation between the second component U comprised in the received ciphertext set and the output $H_2(e(Prv_{reci}, V))$ of the application of the second cryptographic hash function $H_2$ to the result of the application of the bilinear map e to the recipient private key $Prv_{reci}$ and the first component V comprised in the ciphertext set. The secret key is accordingly expressed as σ=U−$H_2$(e($Prv_{reci}$, V)). The subtraction operation may be performed over $\mathbb{F}_2[x]$ in which case, the subtraction operation is an XOR operation;
determine/recover an original message M by decrypting the encoded message C(M) comprised in the received ciphertext set using a decipher $D_σ$ that uses the secret key σ as a decryption key;
determine an auxiliary value r by applying the third cryptographic hash function to the secret key and the original message such that r=$H_3$(σ, M);
verify the sender identify $ID_{send}$ by comparing the third component Y comprised in the ciphertext set to the output $$H_2((e(g_{send}, g_{ID_{TC_s}}) \times e(et_{auths}, Prv_{reci}))^r)$$

of the application of the second cryptographic hash function $H_2$ to a value $$e(g_{send}, g_{ID_{TC_s}}) \times e(et_{auths}, Prv_{reci})$$

to the power the auxiliary value r, the value being given by the product between:
the output $$e(g_{send}, g_{ID_{TC_s}})$$

of the application of the bilinear map e to the sender public key $g_{send}$ and the intermediate sender trusted center public key $$g_{ID_{TC_s}};$$

and
the output $e(et_{auths}, Prv_{reci})$ of the application of the bilinear map e to the sender authentication key $et_{auths}$ and the recipient private key $Prv_{reci}$.
The recipient 105 verifies the sender identity if the recipient 105 determines that $$Y = H_2((e(g_{send}, g_{ID_{TC_s}}) \times e(et_{auths}, Prv_{reci}))^r).$$

According to some embodiments, the cipher/decipher $E_σ/D_σ$ may be any symmetric encryption/decryption algorithm/protocol/function such as the AES, the Triple Data Encryption algorithm, the DES (Data Encryption Standard), the Triple DES (3DES), or the RC4 (Rivest Cipher 4). The cipher/decipher $E_σ/D_σ$ may be configured to perform encryption/decryption using non-tweakable or tweakable modes of operation. Exemplary non-tweakable modes of operations comprise the Electronic Codebook mode (ECB), the Cipher Block Chaining mode (CBC), the Propagating Cipher Block Chaining mode (PCBC), the Cipher Feedback mode (CFB), the Output Feedback mode (OFB), and the Counter mode (CTR). Exemplary tweakable modes of operation comprise the XOR-Encrypt-XOR (XEX) mode and the tweakable with ciphertext stealing mode (XTS).

According to some embodiments, the sender 103 and/or the recipient 105 may be configured to generate the secret key used in the cipher algorithm and the decipher algorithm using a random number generator and/or Physically Unclonable Functions. In some embodiments, a random number generator may be chosen in a group comprising a pseudo-random number generator and a true random number generator.

There is also provided a method for sending an encrypted message M(C) from a sender 103 to a recipient 105 in an identity-based cryptosystem 100. The cryptosystem comprises a sender trusted center 101 connected to the sender 103 and a recipient trusted center 102 connected to the recipient 105. In the identity-based cryptosystem 100, the sender 103 is associated with a sender identifier $ID_{send}$, the recipient is associated with a recipient identifier $ID_{reci}$, the sender trusted center is associated with a sender trusted center identifier $ID_{TC_s}$, and the recipient trusted center is associated with a recipient trusted center identifier $ID_{TC_r}$. The method comprises making the different identifiers publically known to all the users and trusted centers in the cryptosystem 100.

Figure 2:
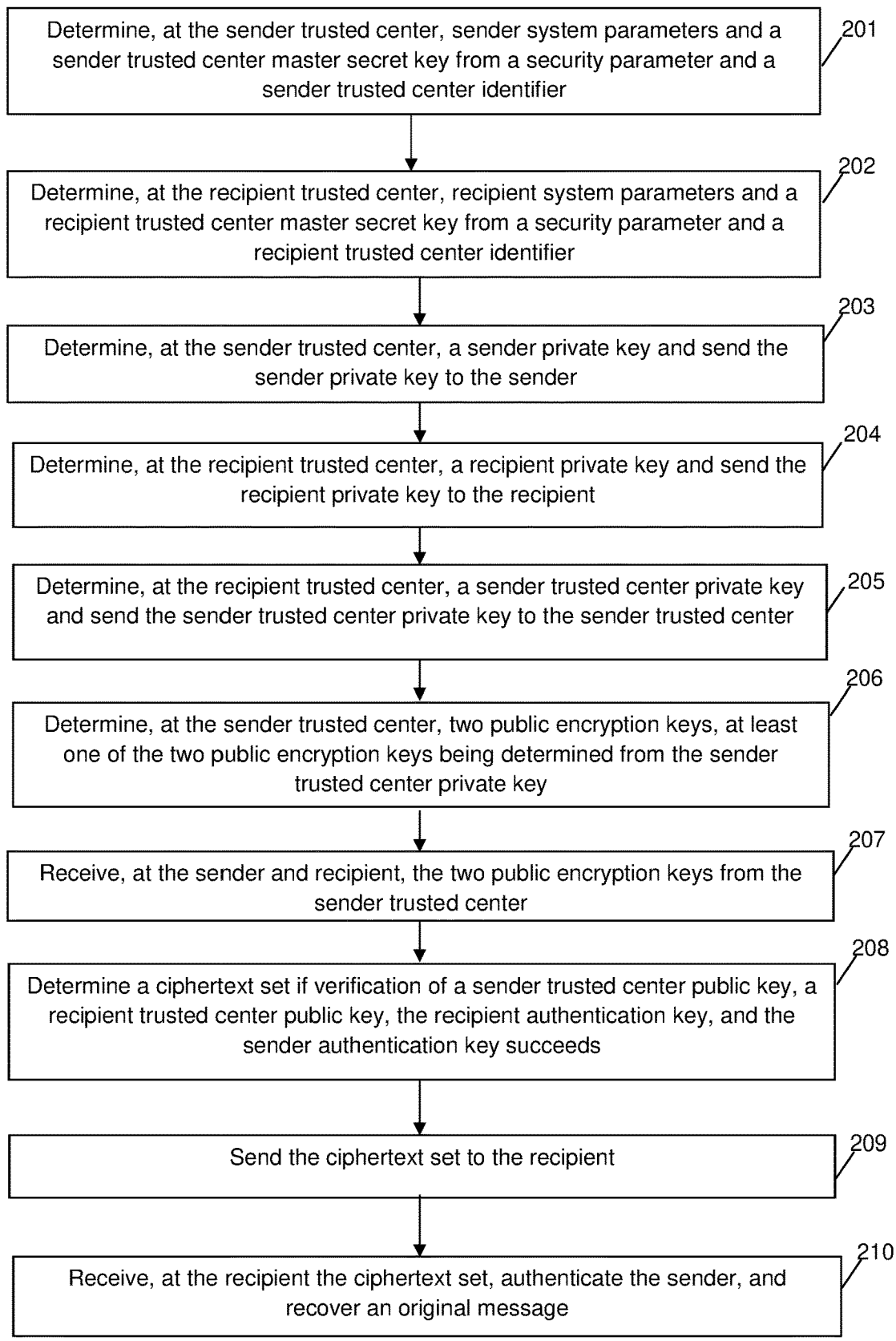
FIG. 2 is a flowchart depicting a method of encrypting and sending a message from a sender to a recipient in a cryptosystem 100, according to some embodiments of the invention.

FIG. 2 is a flowchart depicting a method for sending the encrypted message from the sender 103 to the recipient 105 according to some embodiments of the invention.

At step 201, sender system parameters $PK_s$ and a sender trusted center master key $s_s$ may be determined at the sender trusted center 101 from a sender trusted center security parameter $\lambda_s$ and a sender trusted center identifier $ID_{TC_s}$ associated with the sender trusted center 101, according to a setup algorithm that takes as inputs the sender trusted center security parameter $\lambda_s$ and the sender trusted center identifier $ID_{TC_s}$ and outputs sender system parameters $PK_s$ and a sender trusted center master key $s_s$.

At step 202, recipient system parameters $PK_r$ and a recipient trusted center master key $s_r$ may be determined at the recipient trusted center 102 from a recipient trusted center security parameter $\lambda_r$ and a recipient trusted center identifier $ID_{TC_r}$ associated with the recipient trusted center 102, according to a setup algorithm that takes as inputs the recipient trusted center security parameter $\lambda_r$ and the recipient trusted center identifier $ID_{TC_r}$ and outputs recipient system parameters $PK_r$ and a recipient trusted center master key $s_r$.

At step 203, a sender private key $Prv_{send}$ may be determined at the sender trusted center 101 from the sender trusted center master key $s_s$, the sender system parameters $PK_s$, and the sender identifier $ID_{send}$, by applying a KeyGen algorithm that takes as inputs the sender trusted center master secret key $s_s$, the sender identifier $ID_{send}$, and the sender system parameters $PK_s$, and outputs the sender private key $Prv_{send}$.

At step 204, a recipient private key $Prv_{reci}$ may be determined at the recipient trusted center 102 from the recipient trusted center master key $s_r$, the recipient system parameters $PK_r$, and the recipient identifier $ID_{reci}$, by applying a KeyGen algorithm that takes as inputs the recipient trusted center master secret key $s_r$, the recipient identifier $ID_{reci}$, and the recipient system parameters $PK_r$, and outputs the recipient private key $Prv_{reci}$.

At step 205, sender trusted center private key $Prv_{TC_s}$ may be determined at the recipient trusted center 102 from the recipient trusted center master key $s_s$, the recipient system parameters $PK_r$, and the sender trusted center identifier $ID_{TC_s}$, by applying a KeyGen algorithm that takes as inputs the recipient trusted center master secret key $s_r$, the sender trusted center identifier $ID_{TC_s}$, and the recipient system parameters $PK_r$, and outputs the sender trusted center private key $$Prv_{TC_s}.$$

At step 206, two public authentication keys comprising a sender authentication key $et_{auths}$ and a recipient authentication key $et_{authr}$ may be determined at the sender trusted center 101 from the sender trusted center master key $s_s$, the sender trusted center private key $$Prv_{TC_s},$$

and the recipient trusted center public key $g_{pub_r}$, according to a PubKeyGen algorithm that takes as inputs the sender trusted center master key $s_s$, the sender trusted center private key $$Prv_{TC_s},$$

and the recipient system parameters and outputs the two public encryption keys.

The sender authentication key may be used for the exchange of trust, i.e. for the sender authentication and the verification of a recipient trusted center public key. The recipient authentication key may be used at the recipient for the authentication of the sender authentication key.

At step 207, the two public authentication keys may be sent by the sender trusted center 101 to the sender 103 and the recipient 105 and received at the sender 103 and the recipient 105.

At step 208, a ciphertext set $C_1$ comprising an encrypted message C(M) may be determined at the sender 103 if the verifications of the sender trusted center public key $g_{pub_s}$, the recipient trusted center public key $g_{pub_r}$, and the sender authentication key $et_{auths}$ succeeds, according to the EncryptET algorithm that takes as inputs the recipient identifier, the sender private key, the sender identifier, a given message $M \in \mathcal{M}$ and the sender and recipient system parameters, and outputs the ciphertext set $C_1$.

At step 209, the ciphertext set $C_1$ may be sent to the recipient 105.

At step 210, the ciphertext set $C_1$ may be received at the recipient 105, the sender 103 may be authenticated, and the original message recovered, according to a DecryptET algorithm that takes as inputs the recipient identifier, the recipient private key, the sender identifier, the ciphertext set, the sender and recipient system parameters, the sender trusted center public key and the two public authentication keys, and outputs a recovered original message M.

Figure 3A:
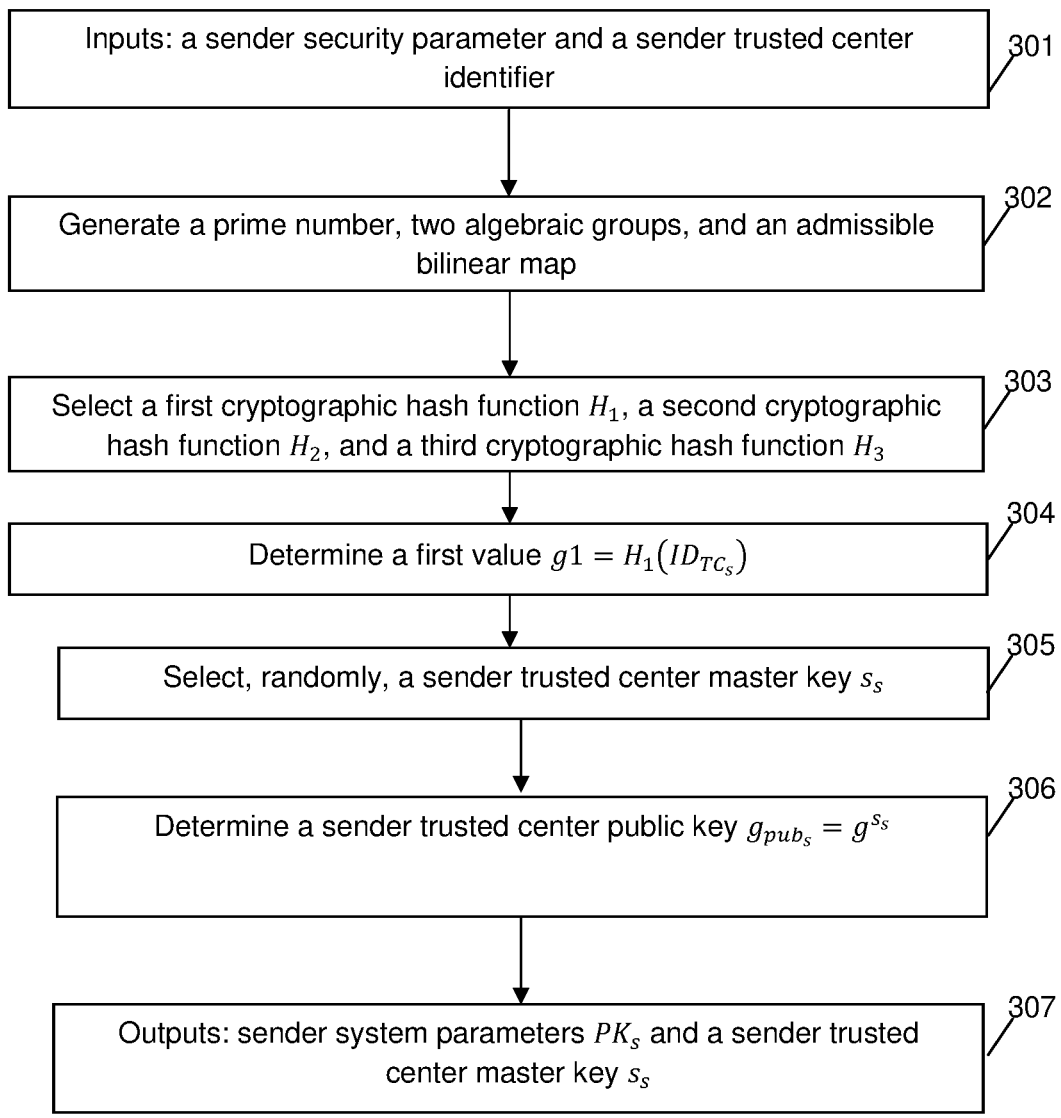
FIG. 3A is a flowchart depicting a method for determining at the sender trusted center sender system parameters and a sender trusted center master key, according to a setup algorithm in accordance with some embodiments of the invention.

FIG. 3A is a flowchart depicting a method of determining the sender system parameters $PK_s=\{p, G, G_T, e, H_1, H_2, H_3, g_{pub_s}\}$ and a sender trusted center master key $s_s$ according to a setup algorithm, the sender system parameters comprising a prime number p, two algebraic groups G and $G_T$ of order equal to the prime number p, an admissible bilinear map e, a first cryptographic hash function $H_1$, a second cryptographic hash function $H_2$, a third cryptographic hash function $H_3$, and a sender trusted center public key $g_{pub_s}$ associated with the sender trusted center identifier $ID_{TC_s}$.

At step 301, input parameters of the setup algorithm may be received, including a sender trusted center security parameter denoted by $\lambda_s \in \mathbb{Z}^+$ and a sender trusted center identifier $ID_{TC_s}$.

At step 302, a prime number p, two algebraic groups G and $G_T$ and an admissible bilinear map e may be determined by running a Bilinear Diffie-Hellman parameter generator that takes as input the sender trusted center security parameter $\lambda_s$ and outputs a prime number p, the description of two groups G and $G_T$ and the description of an admissible bilinear map e: $G \times G \to G_T$.

At step 303, a first cryptographic hash function $H_1$: $\{0,1\}^n \to G$, a second cryptographic hash function $H_2$: $G_T \to \{0,1\}^n$, and a third cryptographic hash function $H_3$: $\{0,1\}^n \times \{0,1\}^n \to \mathbb{Z}_p^n$, may be selected, for example among a predefined set of cryptographic hash functions. The cryptographic hash function $H_1, H_2$ and $H_3$ may be random oracles.

At step 304, a first value g1 may be determined by applying the first cryptographic hash function $H_1$ to the sender trusted center identifier $ID_{TC_s}$ such that $g1 = H_1(ID_{TC_s})$.

At step 305, a sender trusted center master key $s_s \in \mathbb{Z}_p^+$ may be selected randomly.

At step 306, a sender trusted center public key $g_{pub_s}$ may be determined by applying an exponentiation function defined by a base and an exponent, the base being equal to the first value g1, and the exponent being equal to the sender trusted center master key $s_s$ such that $g_{pub_s} = g1^{s_s}$. In embodiments in which the first value corresponds to a point of an elliptic curve, the exponentiation function may be replaced with a scalar multiplication function according to which the sender trusted center master key is given by the product $g_{pub_s} = [s_s]g1$.

At step 307, the sender system parameters $PK_s = \{p, G, G_T, e, H_1, H_2, H_3, g_{pub_s}\}$ and the sender trusted center master key $s_s$ may be output. The sender system parameters may be disseminated to the sender 103, the recipient 105, and the recipient trusted center 102, while the sender trusted center master key may be kept secret at the sender trusted center 101.

Figure 3B:
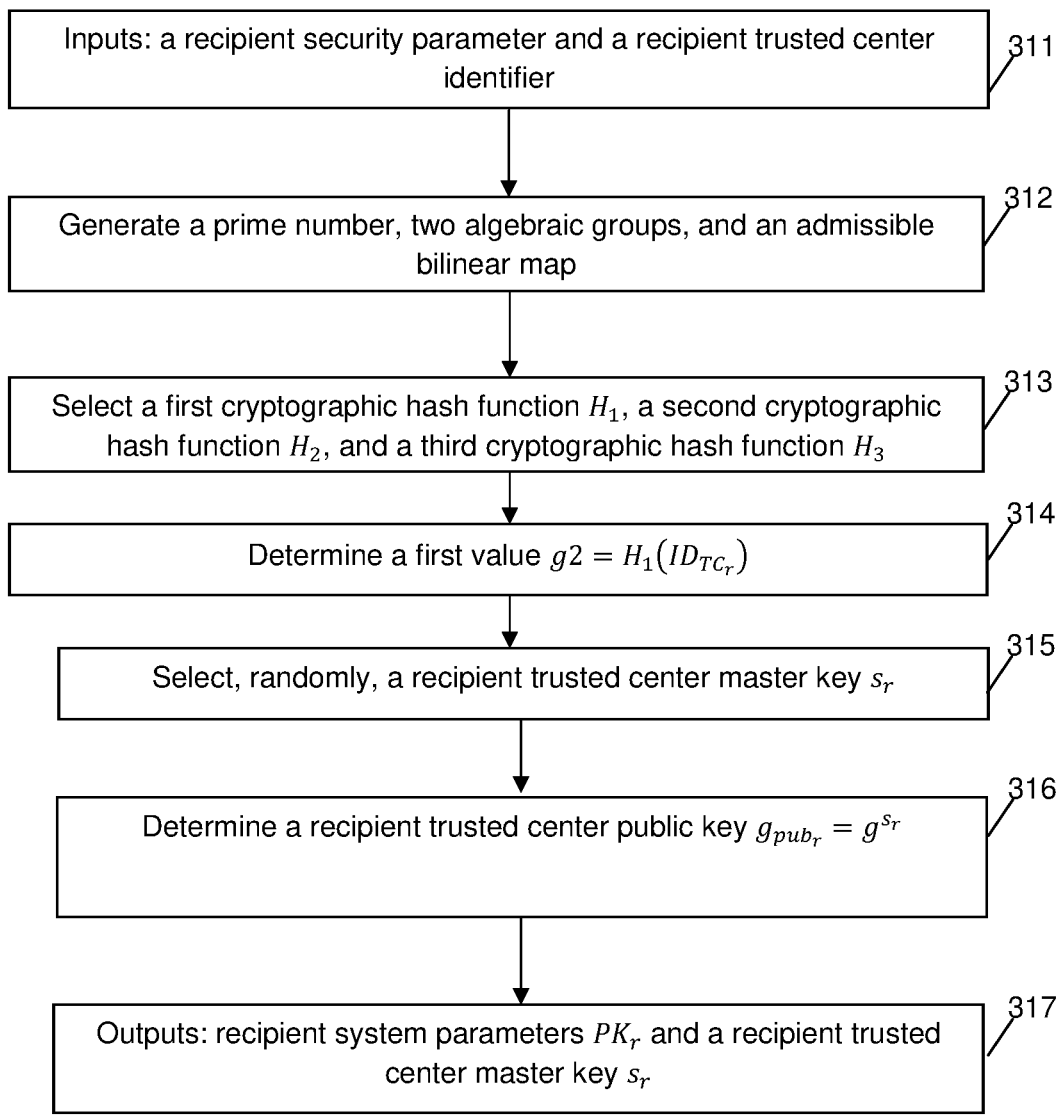
FIG. 3B is a flowchart depicting a method for determining recipient trusted center recipient system parameters and a recipient trusted center master key, according to a setup algorithm in accordance with some embodiments of the invention.

FIG. 3B is a flowchart depicting a method of determining the recipient system parameters $PK_r = \{p, G, G_T, e, H_1, H_2, H_3, g_{pub_r}\}$ and a recipient trusted center master key $s_r$ according to a setup algorithm, the recipient system parameters comprising a prime number p, two algebraic groups G and $G_T$ of order equal to the prime number p, an admissible bilinear map e, a first cryptographic hash function $H_1$, a second cryptographic hash function $H_2$, a third cryptographic hash function $H_3$, and a recipient trusted center public key $g_{pub_r}$ associated with the recipient trusted center identifier $ID_{TC_r}$.

At step 311, input parameters of the setup algorithm may be received, including a recipient trusted center security parameter denoted by $\lambda_r \in \mathbb{Z}^+$ and a recipient trusted center identifier $ID_{TC_r}$.

At step 312, a prime number p, two algebraic groups G and $G_T$ and an admissible bilinear map e may be determined by running a Bilinear Diffie-Hellman parameter generator that takes as input the recipient trusted center security parameter $\lambda_r$ and outputs a prime number p, the description of two groups G and $G_T$ and the description of an admissible bilinear map e: $G \times G \to G_T$.

At step 313, a first cryptographic hash function $H_1$: $\{0,1\}^n \to G$, a second cryptographic hash function $H_2$: $G_T \to \{0,1\}^n$, and a third cryptographic hash function $H_3$: $\{0,1\}^n \times \{0,1\}^n \to \mathbb{Z}_p^n$ may be selected, for example among a predefined set of cryptographic hash functions. The cryptographic hash function $H_1, H_2$ and $H_3$ may be random oracles.

At step 314, a first value g2 may be determined by applying the first cryptographic hash function $H_1$ to the recipient trusted center identifier $ID_{TC_r}$ such that $g2 = H_1(ID_{TC_r})$.

At step 315, a sender trusted center master key $s_r \in \mathbb{Z}_p^+$ may be selected randomly.

At step 316, a recipient trusted center public key $g_{pub_r}$ may be determined by applying an exponentiation function defined by a base and an exponent, the base being equal to the first value g2, and the exponent being equal to the recipient trusted center master key $s_r$ such that $g_{pub_r} = g2^{s_r}$. In embodiments in which the first value g2 corresponds to a point of an elliptic curve, the exponentiation function may be reduced to performing a scalar multiplication function according to which $g_{pub_r} = [s_r]g2$.

At step 317, the recipient system parameters $PK_r = \{p, G, G_T, e, H_1, H_2, H_3, g_{pub_r}\}$ and the recipient trusted center master key $s_r$ may be output. The recipient system parameters may be disseminated to the sender 103, the recipient 105, and the sender trusted center 101, while the recipient trusted center master key may be kept secret at the recipient trusted center 102.

According to some embodiments, the sender system parameters and the recipient system parameters may satisfy:

$$PK_s = \{p, G, G_T, e, H_1, H_2, H_3, g_{pub_s}\} = PK_r = \{p, G, G_T, e, H_1, H_2, H_3, g_{pub_r}\}.$$

Figure 4A:
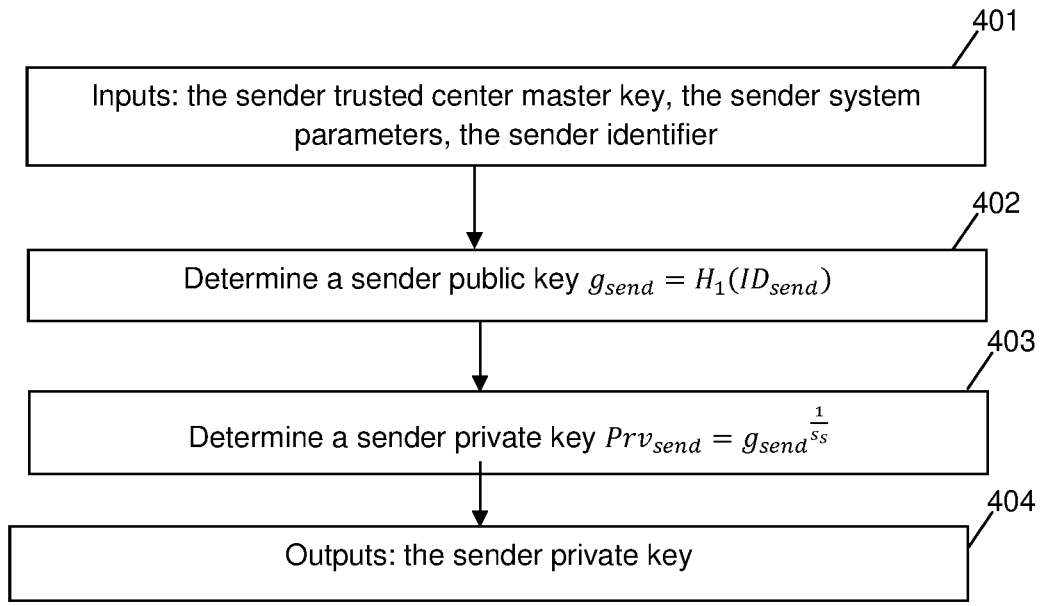
FIG. 4A is a flowchart depicting a method for determining at the sender trusted center a sender private key according to the KeyGen algorithm, in accordance with some embodiments of the invention.

FIG. 4A is a flowchart depicting a method for determining a sender private key $Prv_{send}$ according to the KeyGen algorithm.

At step 401, the inputs of the KeyGen algorithm may be received, including the sender trusted center master secret key $s_s$, the sender system parameters $PK_s$, and the sender identifier $ID_{send}$.

At step 402, a sender public key $g_{send}$ may be determined by applying the first hash function $H_1$ to the sender identifier $ID_{send}$ such that $g_{send} = H_1(ID_{send})$.

At step 403, a sender private key $Prv_{send}$ may be determined by applying an exponentiation function defined by a base and an exponent, the base being equal to the sender public key $g_{send}$, and the exponent being equal to the inverse of the sender trusted center master secret key $$\frac{1}{s_s}$$

such that $$Prv_{send} = g_{send}^{\frac{1}{s_s}}.$$

The exponentiation function may be replaced by a scalar multiplication function such that $$Prv_{send} = \left[\frac{1}{s_s}\right] g_{send}$$

if the sender public key corresponds to a point of an elliptic curve.

At step 404, the sender private key $Prv_{send}$ may be output.

Figure 4B:
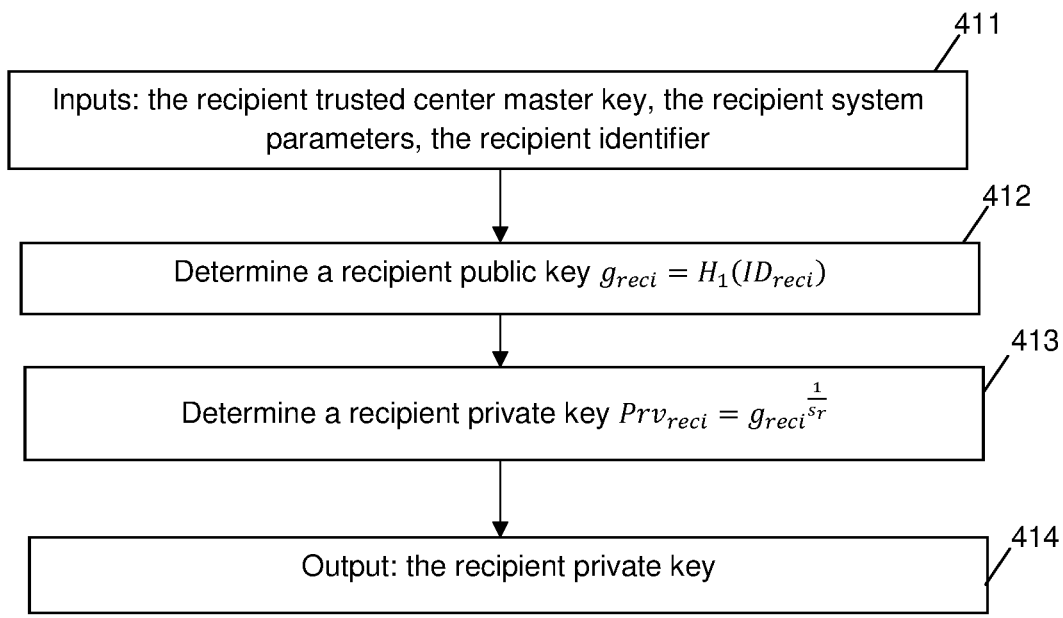
FIG. 4B is a flowchart depicting a method for determining at the recipient trusted center a recipient private key, according to the KeyGen algorithm, in accordance with some embodiments of the invention.

FIG. 4B is a flowchart depicting a method for determining a recipient private key $Prv_{reci}$ according to the KeyGen algorithm.

At step 411, the inputs of the KeyGen algorithm may be received, including the recipient trusted center master secret key $s_r$, the recipient system parameters $PK_r$, and the recipient identifier $ID_{reci}$.

At step 412, a recipient public key $g_{reci}$ may be determined by applying the first hash function $H_1$ to the recipient identifier $ID_{reci}$ such that $g_{reci}=H_1(ID_{reci})$.

At step 413, a recipient private key $Prv_{reci}$ may be determined by applying an exponentiation function defined by a base and an exponent, the base being equal to the recipient public key $g_{reci}$, and the exponent being equal to the inverse of the recipient trusted center master key $$\frac{1}{s_r}$$

such that $$Prv_{reci} = g_{reci}^{\frac{1}{s_r}}.$$

The exponentiation function may be replaced with a scalar multiplication function according to which $$Prv_{reci} = \left[\frac{1}{s_r}\right] g_{reci}$$

if the recipient public key corresponds to a point of an elliptic curve.

At step 404, the sender private key $Prv_{reci}$ may be output.

Figure 4C:
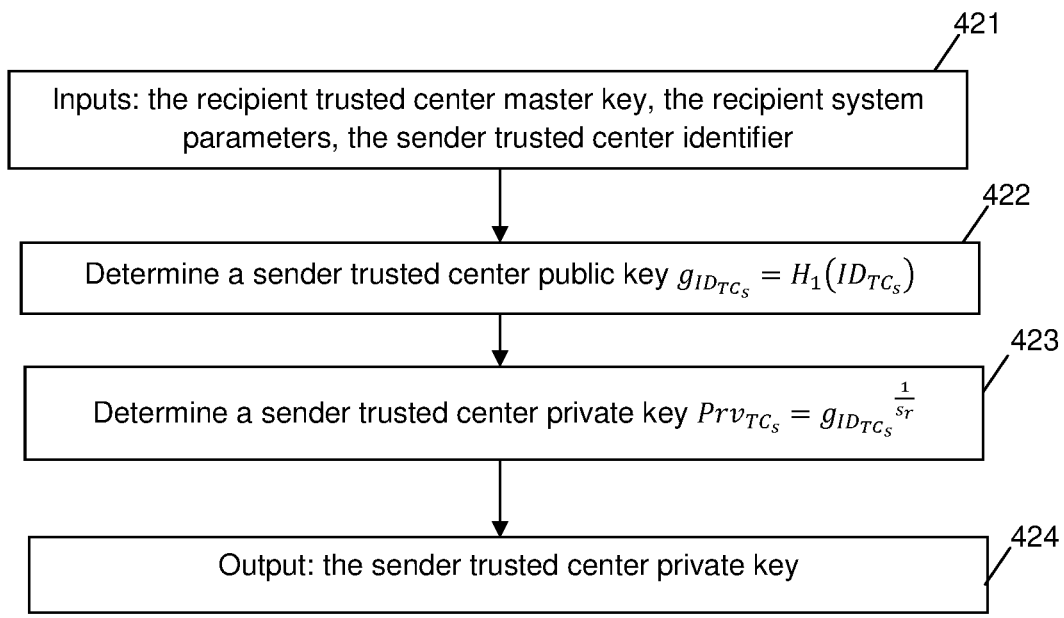
FIG. 4C is a flowchart depicting a method for determining at the recipient trusted center a sender trusted center private key according to the KeyGen algorithm, in accordance with some embodiments of the invention.

FIG. 4C is a flowchart depicting a method for determining a sender trusted center private key $Prv_{TC_s}$ according to the KeyGen algorithm.

At step 421, the inputs of the KeyGen algorithm may be received, including the recipient trusted center master secret key $s_r$, the recipient system parameters $PK_r$, and the sender trusted center identifier $ID_{TC_s}$.

At step 422, a sender trusted center public key $$g_{ID_{TC_s}}$$

may be determined by applying the first hash function $H_1$ to the sender trusted center identifier $ID_{TC_s}$ such that $$g_{ID_{TC_s}} = H_1(ID_{TC_s}).$$

At step 423, a sender trusted center private key $$Prv_{TC_s}$$

may be determined by applying an exponentiation function defined by a base and an exponent, the base being equal to the intermediate sender trusted center public key $$g_{ID_{TC_s}},$$

and the exponent being equal to the inverse of the recipient trusted center master secret key $$\frac{1}{s_r}$$

such that $$Prv_{TC_s} = g_{ID_{TC_s}}^{\frac{1}{s_r}}.$$

The exponentiation function may be replaced with a scalar multiplication function according to which $$Prv_{TC_s} = \left[\frac{1}{s_r}\right] g_{ID_{TC_s}}$$

if the sender trusted center public key corresponds to a point of an elliptic curve.

At step 424, the sender trusted center private key $Prv_{reci}$ may be output.

Figure 5:
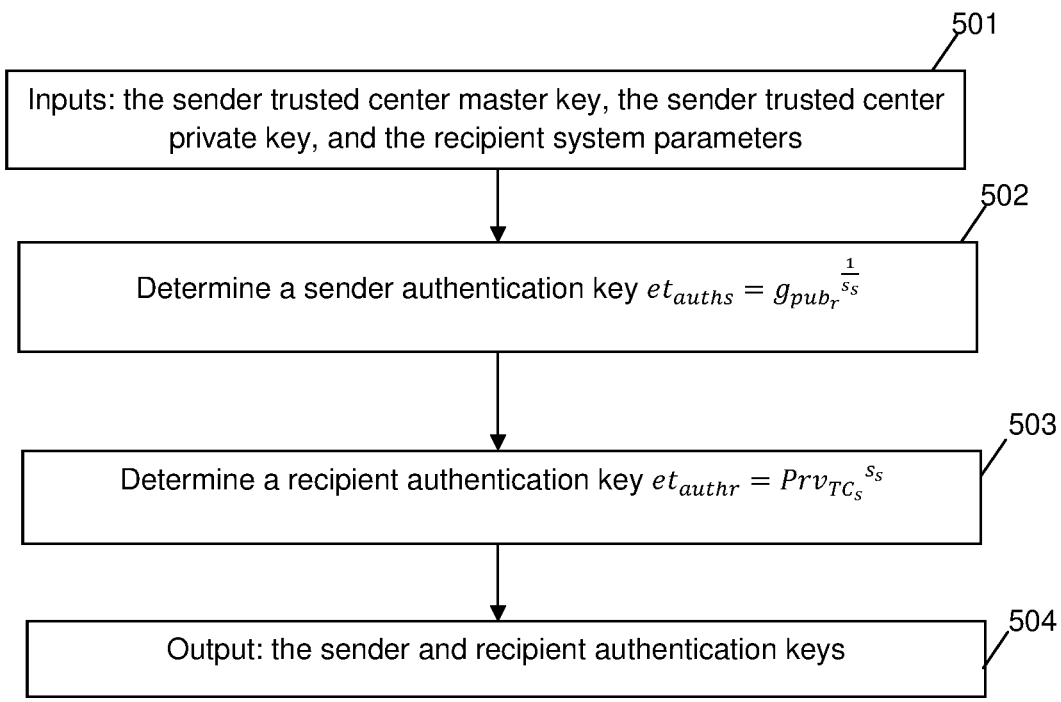
FIG. 5 is a flowchart depicting a method for determining two authentication keys at the sender trusted center 103 according to the PubKeyGenET algorithm, in accordance with some embodiments of the invention.

FIG. 5 is a flowchart depicting a method for determining two authentication keys at the sender trusted center 103 according to the PubKeyGenET algorithm.

At step 501, the inputs of the PubKeyGenET algorithm may be received, including the sender trusted center master key $s_s$, the sender trusted center private key $$Prv_{TC_s},$$

and the recipient trusted center public key $g_{pub_r}$.

At step 502, a sender authentication key $et_{auths}$ may be determined by applying an exponentiation function of a base equal to the recipient trusted center public key $g_{pub_r}$ and an exponent equal to the inverse of the sender trusted center master key $s_s$ such that $$et_{auths} = g_{pub_r}^{\frac{1}{s_s}}.$$

In embodiments in which the recipient trusted center public key corresponds to a point of an elliptic curve, the exponentiation function performed to determine the sender authentication key may be replaced with a scalar multiplication such that $$et_{auths} = \left[\frac{1}{s_s}\right] g_{pub_r}.$$

At step 503, a recipient authentication key $et_{auth_r}$ may be determined by applying an exponentiation function of a base equal to the sender trusted center private key $$Prv_{TC_s}$$

and an exponent equal to the sender trusted center master key $s_s$ such that $$et_{auth_r} = Prv_{TC_s}^{s_s}.$$

In some embodiments in which the sender trusted center private key corresponds to a point of an elliptic curve, the exponentiation function may be replaced with a scalar multiplication according to which $$et_{auth_r} = [s_s]Prv_{TC_s}.$$

The sender and recipient authentication keys may be disseminated to the sender 103 and the recipient 105.

Figure 6:
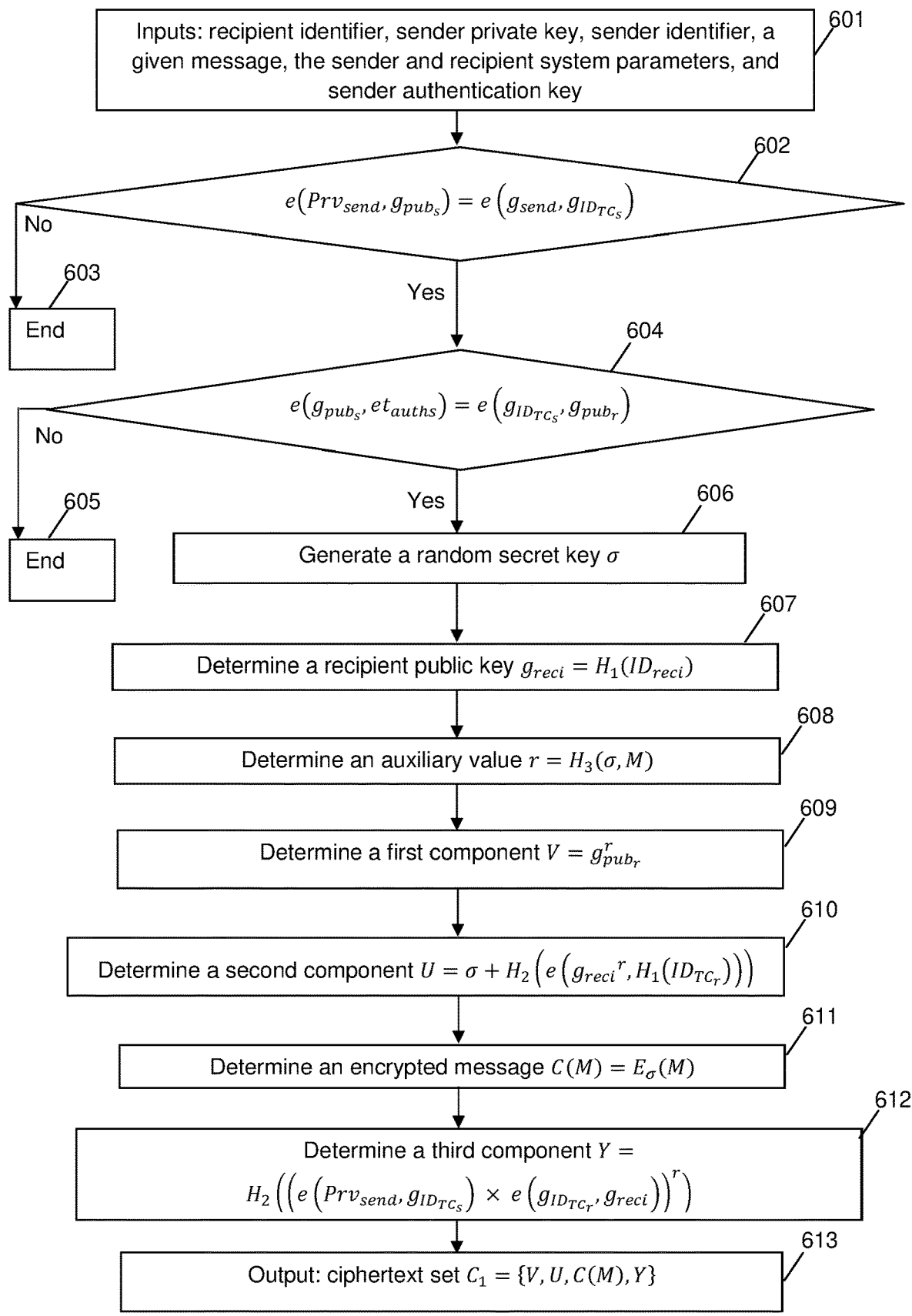
FIG. 6 is a flowchart depicting a method for determining, at the sender 103, a ciphertext set comprising an encrypted message, according to the EncryptET algorithm in accordance with some embodiments of the invention.

FIG. 6 is a flowchart depicting a method for determining, at the sender 103, a ciphertext set comprising an encrypted message, according to the EncryptET algorithm, the ciphertext set $C_1=\{V, U, C(M), Y\}$ comprises, in addition to the encrypted message $C(M)$, the a first component V, a second component U, and a third component Y.

At step 601, the inputs of the EncryptET algorithm may be received, including the recipient identifier $ID_{rec_i}$, a sender private key $Prv_{send}$, a given message M, the sender and recipient system parameters $PK_s$ and $PK_r$, and sender authentication key $et_{auth_s}$.

At step 602, the sender trusted center public key may be verified by comparing a first value $e(Prv_{send}, g_{pub_s})$ to a second value $$e(g_{send}, g_{ID_{TC_s}}).$$

If it is determined at step 602 that the sender trusted center public key is not verified, i.e. if it is determined at step 602 that $$e(Prv_{send}, g_{pub_s}) \neq e(g_{send}, g_{ID_{TC_s}}),$$

then the processing may end at step 603.

If it is determined at step 602 that the sender trusted center public key is verified, i.e. if it is determined at step 602 that $$e(Prv_{send}, g_{pub_s}) = e(g_{send}, g_{ID_{TC_s}}),$$

then the sender authentication key may be verified at step 604 by comparing a third value $e(g_{pub_s}, et_{auth_s})$ to a fourth value $$e(g_{ID_{TC_s}}, g_{pub_r}).$$

If it is determined at step 604 that the sender authentication key is not verified, i.e. if it is determined at step 604 that $$e(g_{pub_s}, et_{auth_s}) \neq e(g_{ID_{TC_s}}, g_{pub_r}),$$

then the processing may be interrupted at step 605.

If it is determined at step 604 that the sender authentication key is verified, i.e. if it is determined at step 604 that $$e(g_{pub_s}, et_{auth_s}) = e(g_{ID_{TC_s}}, g_{pub_r}),$$

then steps 606 to 612 may be performed to determine the ciphertext set.

At step 606, a random secret key $\sigma$ may be generated.

At step 607, a recipient public key $g_{rec_i}$ may be determined by applying the first cryptographic hash function $H_1$ to the recipient identifier $ID_{rec_i}$ such that $g_{rec_i}=H_1(ID_{rec_i})$.

At step 608, an auxiliary value r may be determined by applying the third cryptographic hash function $H_3$ to the random secret value $\sigma$ and the given message M such that $r=H_3(\sigma,M)$.

At step 609, the first component V may be determined by applying an exponentiation function of a basis equal to the recipient trusted center public key $g_{pub_r}$ comprised in the recipient system parameters and an exponent equal to the auxiliary value, such that $V=g_{pub_r}^r$. The exponentiation function may be replaced with a scalar multiplication according to which $V=[r]g_{pub_r}$ if the recipient trusted center public key corresponds to a point of an elliptic curve.

At step 610, the second component U may be determined by applying an addition operation to the random secret key $\sigma$ and the output $H_2(e(g_{rec_i}^r, H_1(ID_{TC_r})))$ of the application of the second cryptographic hash function $H_2$ to the output $e(g_{rec_i}^r, H_1(ID_{TC_r}))$ of the application of the bilinear map e to a first input $g_{rec_i}^r$ and a second input $H_1(ID_{TC_r})$, the first input $g_{rec_i}^r$ being given by the recipient public key $g_{rec_i}$ to the power the auxiliary value r, the second input $H_1(ID_{TC_r})$ being given by the output of the application of the first cryptographic hash function $H_1$ to the recipient trusted center identifier $ID_{TC_r}$. The second component is accordingly given by $U=\sigma+H_2(e(g_{rec_i}^r, H_1(ID_{TC_r}))$. The addition operation may be performed over $\mathbb{F}_2[x]$ in which case, the addition operation is an XOR operation.

At step 611, an encrypted message $C(M)$ may be determined by applying a cipher $E_\sigma$ to the given message M, the cipher $E_\sigma$ using the random secret key $\sigma$ as encryption key.

At step 612, the third component Y may be determined by applying the second cryptographic hash function $H_2$ to the output $$e(Prv_{send}, g_{ID_{TC_s}}) \times e(g_{ID_{TC_r}}, g_{rec_i})$$

of the product between a first input $$e(Prv_{send}, g_{ID_{TC_s}})$$

and a second input $$e(g_{ID_{TC_r}}, g_{reci})$$

to the power the auxiliary value r, the first input $$e(Prv_{send}, g_{ID_{TC_s}})$$

being the output of the application of the bilinear map e to the sender private key $Prv_{send}$ and the intermediate sender trusted center public key $$g_{ID_{TC_s}}.$$

The second input $$e(g_{ID_{TC_r}}, g_{reci})$$

is the output of the application of the bilinear map e to an intermediate recipient trusted center public key $$g_{ID_{TC_r}}$$

and the recipient public key $g_{reci}$. The third component is accordingly given by $$Y = H_2((e(Prv_{send}, g_{ID_{TC_s}}) \times e(g_{ID_{TC_r}}, g_{reci}))^r).$$

At step 613, the ciphertext set $C_1=\{V, U, C(M), Y\}$ may be output.

Figure 7:
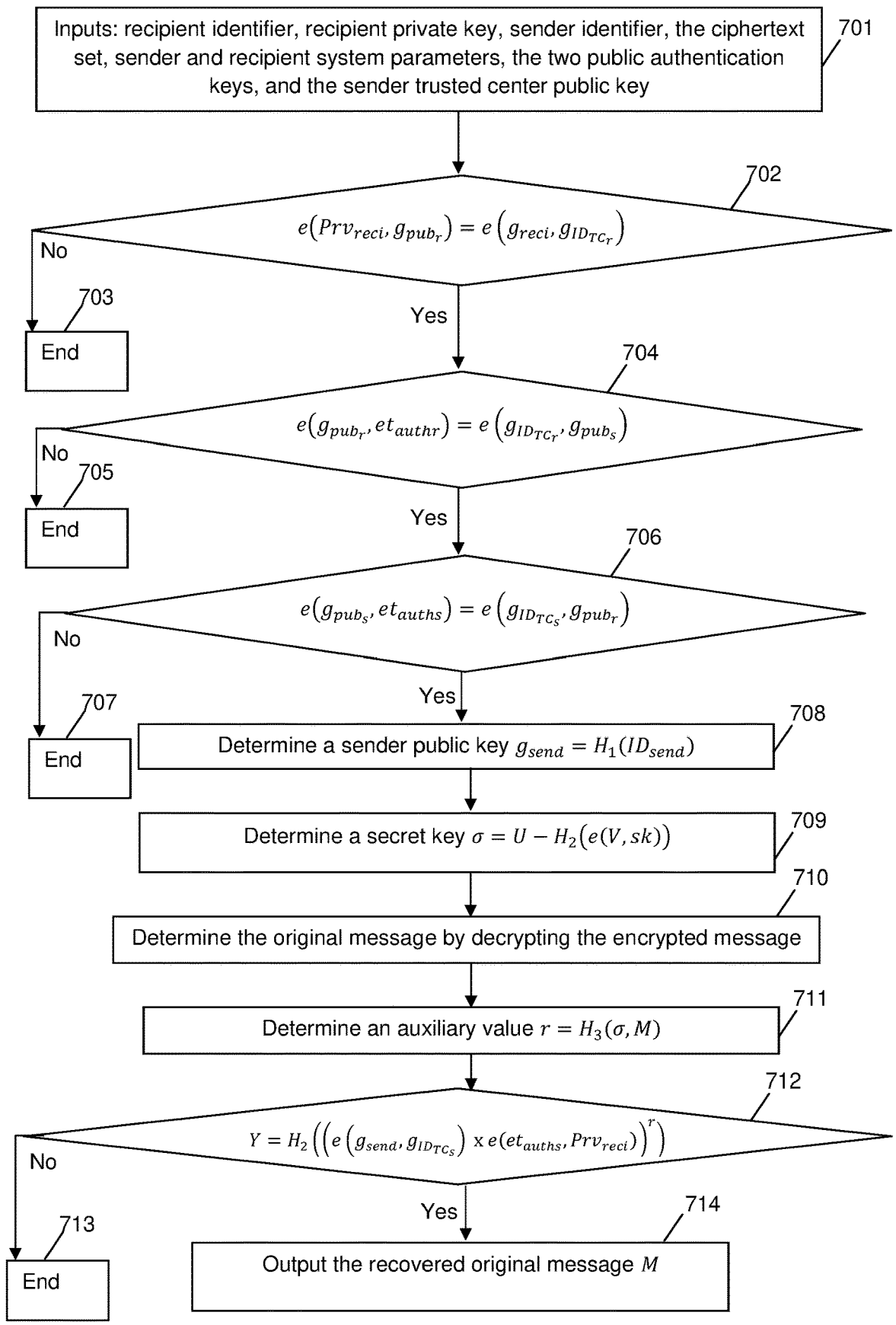
FIG. 7 is a flowchart depicting a method for determining a recovered original message at the recipient 105, according to a DecryptET algorithm in accordance with some embodiments of the invention.

FIG. 7 is a flowchart depicting a method for determining a recovered original message at the recipient 105, according to a DecryptET algorithm.

At step 701, the inputs of the DecryptET algorithm may be received, including the recipient identifier $ID_{reci}$, the recipient private key $Prv_{reci}$, the sender identifier $ID_{send}$, the ciphertext set $C_1=\{V, U, C(M), Y\}$, the sender and recipient system parameters $PK_s$ and $PK_r$, the two public authentication keys $et_{auths}$ and $et_{authr}$, and the sender trusted center public key $g_{pub_s}$.

At step 702, the recipient trusted center public key may be verified by comparing the output $e(Prv_{reci}, g_{pub_r})$ of the application of the bilinear map e to the recipient private key $Prv_{reci}$ and the recipient trusted center public key $g_{pub_r}$ to the output $$e(g_{reci}, g_{ID_{TC_r}})$$

of the application of the bilinear map e to the recipient public key $g_{reci}$ and the intermediate trusted center public key $g_{ID_{TC_r}}.$ If it is determined at step 702 that the recipient trusted center public key is not verified, i.e. if it is determined at step 702 that $$e(Prv_{reci}, g_{pub_r}) \neq e(g_{reci}, g_{ID_{TC_r}}),$$

then the processing may be interrupted at step 703.
If it is determined at step 702 that the recipient trusted center public key is verified, i.e. if it is determined at step 702 that $$e(Prv_{reci}, g_{pub_r}) = e(g_{reci}, g_{ID_{TC_r}}),$$

then the recipient authentication key $et_{authr}$ and the sender trusted center public key $g_{pub_s}$ may be verified at step 704 by comparing the output $e(g_{pub_r}, et_{authr})$ of the application of the bilinear map e to the recipient trusted center public key $g_{pub_r}$ comprised in the recipient system parameters and the recipient authentication key $et_{authr}$, to the output $$e(g_{ID_{TC_r}}, g_{pub_s})$$

of the application of the bilinear map e to the intermediate recipient trusted center public key $$g_{ID_{TC_r}}$$

and the sender trusted center public key $g_{pub_s}$.
If it is determined at step 704 that the recipient authentication key and the sender trusted center public key are not verified, i.e. if it is determined at step 704 that $$e(g_{pub_r}, et_{authr}) \neq e(g_{ID_{TC_r}}, g_{pub_s}),$$

then the processing may be stopped at step 705.
If it is determined at step 704 that the recipient authentication key and the sender trusted center public key are verified, i.e. if it is determined at step 704 that $$e(g_{pub_r}, et_{authr}) = e(g_{ID_{TC_r}}, g_{pub_s}),$$

then the sender authentication key $et_{auths}$ may be verified at step 706 by comparing the output $e(g_{pub_s}, et_{auths})$ of the application of the bilinear map e to the sender trusted center public key $g_{pub_s}$ and the sender authentication key $et_{auths}$, to the output $$e(g_{ID_{TC_s}}, g_{pub_r})$$

of the application of the bilinear map e to the intermediate sender trusted center public key $$g_{ID_{TC_s}}$$

and the recipient trusted center public key $g_{pub_r}$.

If it is determined at step 706 that the sender authentication key is not verified, i.e. if it is determined at step 706 that $$e(g_{pub_s}, et_{auths}) \neq e(g_{ID_{TC_s}}, g_{pub_r}),$$

then the processing may be ended at step 707.

If it is determined at step 706 that the sender authentication key is verified, i.e. if it is determined at step 706 that $$e(g_{pub_s}, et_{auths}) = e(g_{ID_{TC_s}}, g_{pub_r}),$$

then steps 708 to 710 may be performed to determine a recovered original message.

At step 708, a sender public key $g_{send}$ may be determined by applying the first cryptographic hash function $H_1$ to the sender identifier $ID_{send}$ such that $g_{send}=H_1(ID_{send})$.

At step 709, a secret key $\sigma=U-H_2(e(Prv_{reci},V))$ may be determined by applying a subtraction operation between the second component U comprised in the received ciphertext set and the output $H_2(e(Prv_{reci}, V))$ of the application of the second cryptographic hash function $H_2$ to the result of the application of the bilinear map e to the recipient private key $Prv_{reci}$ and the first component V comprised in the ciphertext set. The subtraction operation may be performed over $\mathbb{F}[x]$ in which case, the subtraction operation is an XOR operation.

At step 710, an original message M may be recovered/determined by decrypting the encoded message C(M) comprised in the received ciphertext set using a decipher $D_\sigma$ that uses the secret key σ as a decryption key.

At step 711, an auxiliary value r may be determined by applying the third cryptographic hash function to the secret key and the recovered original message such that $r=H_3(\sigma, M)$.

At step 712, the sender identify $ID_{send}$ may be verified by comparing the third component Y comprised in the ciphertext set to the output $$H_2((e(g_{send}, g_{ID_{TC_s}}) \times e(et_{auths}, Prv_{reci}))^r)$$

of the application of the second cryptographic hash function $H_2$ to a value $$e(g_{send}, g_{ID_{TC_s}}) \times e(et_{auths}, Prv_{reci})$$

to the power the auxiliary value r, the value being given by the product between:

the output $$e(g_{send}, g_{ID_{TC_s}})$$

of the application of the bilinear map e to the sender public key $g_{send}$ and the intermediate sender trusted center public key $$g_{ID_{TC_s}},$$

and the output $e(et_{auths}, Prv_{reci})$ of the application of the bilinear map e to the sender authentication key $et_{auths}$ and the recipient private key $Prv_{reci}$.

If it is determined at step 712 that the sender identity is not verified, i.e. if it is determined at step 712 that $$Y \neq H_2((e(g_{send}, g_{ID_{TC_s}}) \times e(et_{auths}, Prv_{reci}))^r),$$

then the processing may be interrupted at step 713.

If it is determined at step 712 that the sender identity is verified, i.e. if it is determined at step 712 that $$Y = H_2((e(g_{send}, g_{ID_{TC_s}}) \times e(et_{auths}, Prv_{reci}))^r),$$

then the recovered original message may be output at step 714.

A proof of exchange is presented hereinafter according to the various embodiments of the invention and the algorithms PubKeyGenET, EncryptET, and DecryptET.

The algorithm EncryptET exploits the following variables:

$$g_{pub_s} = g_{Id_{TC_s}}^{s_s}; \; et_{auths} = g_{Id_{TC_r}}^{\frac{s_r}{s_s}}, \text{ and } g_{pub_r} = g_{Id_{TC_r}}^{s_r}.$$

The verification of the validity of $et_{auths}$ succeeds if the following equality is satisfied:

$$e(g_{pub_s}, et_{auths}) = e\left(g_{ID_{TC_s}}^{s_s}, g_{ID_{TC_r}}^{\frac{s_r}{s_s}}\right) = e(g_{ID_{TC_s}}, g_{ID_{TC_r}}^{s_r}) = e(g_{ID_{TC_r}}, g_{pub_r})$$

The steps 702, 704, and 706 of the algorithm DecryptET allow to verify the identity of the sender. The DecryptET exploits the following variables:

$$Prv_{recipient} = g_{reci}^{\frac{1}{s_r}}; \; g_{pub_r} = g_{Id_{TC_r}}^{s_r}; \; et_{authr} = g_{Id_{TC_s}}^{\frac{s_s}{s_r}};$$

$$g_{pub_s} = g_{Id_{TC_s}}^{s_s}, \; et_{auths} = g_{Id_{TC_r}}^{\frac{s_r}{s_s}}; \; V = g_{pub_r}^r = g_{Id_{TC_r}}^{s_r r},$$

where $r = H_3[\sigma, M]; \; U = \sigma \oplus H_2[e(g_{reci}^r, H_1[Id_{TC_r}])];$ $$W = E_\sigma(M), \text{ and } Y = H_2[e(Prv_{send}, g_{Id_{TC_s}}) \times e(g_{Id_{TC_r}}, g_{reci})^r].$$

The verification of the sender trusted center public key is successful if the following equality is satisfied:

$$e(Prv_{reci}, g_{pub_r}) = e\left(g_{reci}^{\frac{1}{s_r}}, g_{Id_{TC_r}}^{s_r}\right) = e(g_{recipient}, g_{Id_{TC_r}}).$$

Similarly, the verification of $et_{authr}$ is successful of the following equation is satisfied:

$$e(g_{pub_s}, et_{authr}) = e\left(g_{Id_{TC_r}}^{s_r}, g_{Id_{TC_s}}^{\frac{s_s}{s_r}}\right) = e(g_{Id_{TC_r}}, g_{Id_{TC_s}}^{s_s}) = e(g_{Id_{TC_r}}, g_{pub_s}).$$

Additionally, this verification allows to verify the public key $g_{pub_s}$ of the sender trusted center. This validation is necessary to the validation of the sender authentication key $et_{auths}$.

The final verification of the DecryptET algorithm is successful if the following equality is satisfied:

$$e(g_{pub_s}, et_{auths}) = e\left(g_{Id_{TC_s}}^{s_s}, g_{Id_{TC_r}}^{\frac{s_r}{s_s}}\right) = e(g_{Id_{TC_s}}, g_{Id_{TC_r}}^{s_r}) = e(g_{Id_{TC_s}}, g_{pub_r}).$$

The original message can be recovered using the decrypting process.

Thus, the secret key $\sigma = U - H_2(e(V, sk))$ allows deciphering $W = E_\sigma(M)$ by computing $D_\sigma(W) = D_\sigma(E_\sigma(M)) = M$.

The authentication of the sender is checked at step 712.

There is also provided a program stored in a computer-readable non-transitory medium for sending an encrypted message M(C) from a sender 103 to a recipient 105 in an identity-based cryptosystem 100. The cryptosystem comprises a sender trusted center 101 connected to the sender 103 and a recipient trusted center 102 connected to the recipient 105. In the identity-based cryptosystem 100, the sender 103 is associated with a sender identifier $ID_{send}$, the recipient is associated with a recipient identifier $ID_{reci}$, the sender trusted center is associated with a sender trusted center identifier $ID_{TC_s}$, and the recipient trusted center is associated with a recipient trusted center identifier $ID_{TC_r}$. The program comprises instructions stored on the computer-readable storage medium, that, when executed by a processor, cause the processor to:

- determine sender system parameters $PK_s$ and a sender trusted center master key $s_s$ at the sender trusted center 101 from a sender trusted center security parameter $\lambda_s$ and a sender trusted center identifier $ID_{TC_s}$ associated with the sender trusted center 101, according to a setup algorithm that takes as inputs the sender trusted center security parameter $\lambda_s$ and the sender trusted center identifier $ID_{TC_s}$ and outputs sender system parameters $PK_s$ and a sender trusted center master key $s_s$;
- determine recipient system parameters $PK_r$ and a recipient trusted center master key $s_r$ at the recipient trusted center 102 from a recipient trusted center security parameter $\lambda_r$ and a recipient trusted center identifier $ID_{TC_r}$ associated with the recipient trusted center 102, according to a setup algorithm that takes as inputs the recipient trusted center security parameter $\lambda_r$ and the recipient trusted center identifier $ID_{TC_r}$ and outputs recipient system parameters $PK_r$ and a recipient trusted center master key $s_r$;
- determine a sender private key $Prv_{send}$ at the sender trusted center 101 from the sender trusted center master key $s_s$, the sender system parameters $PK_s$, and the sender identifier $ID_{send}$, by applying a KeyGen algorithm that takes as inputs the sender trusted center master secret key $s_s$, the sender identifier $ID_{send}$, and the sender system parameters $PK_s$, and outputs the sender private key $Prv_{send}$;
- determine a recipient private key $Prv_{reci}$ at the recipient trusted center 102 from the recipient trusted center master key $s_r$, the recipient system parameters $PK_r$, and the recipient identifier $ID_{reci}$, by applying a KeyGen algorithm that takes as inputs the recipient trusted center master secret key $s_r$, the recipient identifier $ID_{reci}$, and the recipient system parameters $PK_r$, and outputs the recipient private key $Prv_{reci}$;
- determine a sender trusted center private key $$Prv_{TC_s}$$

at the recipient trusted center 102 from the recipient trusted center master key $s_r$, the recipient system parameters $PK_r$, and the sender trusted center identifier $ID_{TC_s}$, by applying a KeyGen algorithm that takes as inputs the recipient trusted center master secret key $s_r$, the sender trusted center identifier $ID_{TC_s}$, and the recipient system parameters $PK_r$, and outputs the sender trusted center private $$Prv_{TC_s};$$

- determine, at the sender trusted center 101, two public authentication keys comprising a sender authentication key $et_{auths}$ and a recipient authentication key $et_{authr}$ from the sender trusted center master key $s_s$, the sender trusted center private key $$Prv_{TC_s},$$

and the recipient trusted center public key $g_{pub_r}$, according to a PubKeyGen algorithm that takes as inputs the sender trusted center master key $s_s$, the sender trusted center private key $$Prv_{TC_s},$$

and the recipient system parameters and outputs the two public authentication keys;
- send the two public authentication keys by the sender trusted center 101 to the sender 103 and received at the sender 103;
- determine, at the sender 103, a ciphertext set $C_1$ comprising an encrypted message C(M) if the verifications of the sender trusted center public key $g_{pub_s}$, the recipient trusted center public key $g_{pub_r}$, and the sender authentication key $et_{auths}$ succeeds, according to the EncryptET algorithm that takes as inputs the recipient identifier, the sender private key, the sender identifier, a given message $M \in \mathcal{M}$ and the sender and recipient system parameters, and outputs the ciphertext set $C_1$;
- send the ciphertext set $C_1$ from the sender 103 to the recipient 105;

receive, at the recipient 105, the ciphertext set $C_1$, authenticate the sender 103, and recover the original message, according to a DecryptET algorithm that takes as inputs the recipient identifier, the recipient private key, the sender identifier, the ciphertext set, the sender and recipient system parameters, the sender trusted center public key and the two public authentication keys, and outputs a recovered original message M.

The methods and devices described herein may be implemented by various means. For example, these techniques may be implemented in hardware, software, or a combination thereof. For a hardware implementation, the processing elements of the different devices operating in the system 100 can be implemented for example according to a hardware-only configuration (for example in one or more FPGA, ASIC, or VLSI integrated circuits with the corresponding memory) or according to a configuration using both VLSI and Digital Signal Processor (DSP).

Figure 8:
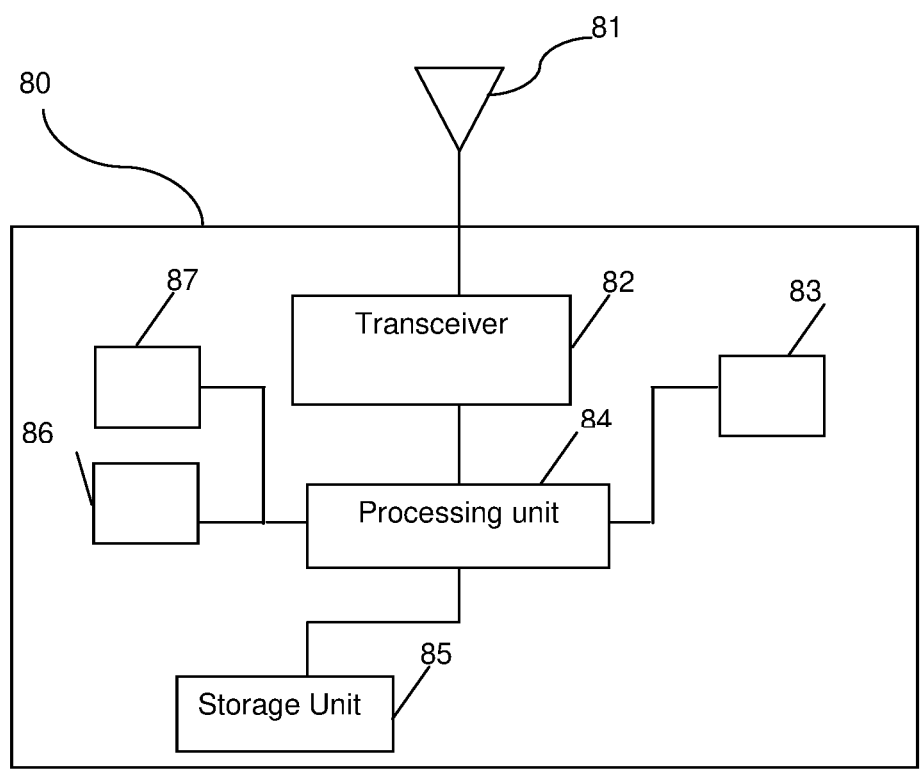
FIG. 8 is a block diagram representing an exemplary hardware/software architecture of a device 80 operating in the cryptosystem 100 (such as the sender, the sender trusted center, the recipient, or the recipient trusted center) according to some embodiments of the invention.

FIG. 8 is a block diagram representing an exemplary hardware/software architecture of a device 80 operating in the cryptosystem 100 such as the sender 103, the recipient 105, the sender trusted center 101, or the recipient trusted center 102, according to some embodiments of the invention.

As illustrated, the architecture may include various computing, processing, storage, communication, sensing, and displaying units comprising:

communication circuitry comprising a transceiver 82 and a transmit/receive element 81 (e.g. one or more antennas) configured to connect the device to corresponding links in the cryptosystem 100 (e.g. connecting the sender 103 to the sender trusted center 101 or connecting the recipient 105 to the recipient trusted center 102 or connecting the recipient 105 to the sender 103 or connecting the sender trusted center 101 to the recipient trusted center 102), and to ensure transmission/reception of exchanged data (e.g. the sender identifier sent from the sender 103 to the sender trusted center 101, or the recipient identifier sent from the recipient 105 to the recipient trusted center 102, or the sender private key sent from the sender trusted center 101 to the sender 103, or the recipient private key sent from the recipient trusted center 102 to the recipient 105, or sender trusted center identifier sent from the sender trusted center 101 to the recipient trusted center 102, or the sender trusted center private key sent from the recipient trusted center 102 to the sender trusted center 101, or the sender authentication key and the recipient authentication key sent from the sender trusted center 101 to the sender 103 and to the recipient 105). The communication circuitry may support various network and air interface such as wired and wireless networks (e.g. wireless local area networks and cellular networks);

a processing unit 84 configured to execute the computer-executable instructions to run the methods and algorithms according to the various embodiments of the invention for to perform the various required functions of the device such as data computation, encryption/decryption operations, generation and processing of random keys and values, and any functionalities required to enable the device to operate in the cryptosystem 100 according to the embodiments of the invention. The processing unit 84 may be a general purpose processor, a special purpose processor, a DSP, a plurality of microprocessors, a controller, a microcontroller, an ASIC, an FPGA circuit, any type of integrated circuit, and the like;

a power source 83 that may be any suitable device providing power to the device 80 such as dry cell batteries, solar cells, and fuel cells;

a storage unit 85 possibly comprising a random access memory (RAM) or a read-only memory used to store processed data (e.g. the sender identifier, the recipient identifier, the sender trusted center identifier, the recipient trusted center identifier, the sender system parameters, the recipient system parameters, the sender public key, the recipient public key, the sender private key, the recipient private key, the sender trusted center master key, the recipient trusted center master key, the sender authentication key, the recipient authentication key, etc.) and any data required to perform the functionalities of the device 80 according to the embodiments of the invention;

Input peripherals 86;

Output peripherals 87 comprising communication means such as displays enabling for example man-to-machine interaction with the device 80 for example for configuration and/or maintenance purposes.

The architecture of the device 80 may further comprise one or more software and/or hardware units configured to provide additional features, functionalities and/or network connectivity.

Furthermore, the method described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An identity-based cryptographic system comprising a transmitter device, a receiver device, a transmitter trusted center connected to said transmitter device, and a receiver trusted center connected to said receiver device, said transmitter device being adapted to send an encrypted message to said receiver device, wherein the transmitter device configured to:

receive, from said transmitter trusted center, two public authentication keys;

check if a set of conditions related to a transmitter trusted center public key, to a receiver trusted center public key, and to a transmitter authentication key comprised in said two public authentication keys are satisfied;
determine a ciphertext set comprising said encrypted message if said set of conditions are satisfied; and
send said ciphertext set to the receiver device,
wherein the ciphertext set further comprises a first component, a second component, and a third component, the transmitter device being further configured to:
determine a random secret key;
determine a receiver public key by applying a first cryptographic hash function to a receiver identifier associated with the receiver device; and
determine an auxiliary value by applying a third cryptographic hash function to said random secret key and a given message,
wherein the first and second components are used by the receiver device to determine the secret key and the third component is used by the receiver device to verify a transmitter identity,
wherein the transmitter device is further configured to:
determine said first component by applying a function defined by a base equal to the receiver trusted center public key, received from the receiver trusted center, and a scalar equal to said auxiliary value;
determine said second component by applying an addition operation to said random secret key and to an output of a second cryptographic hash function applied to the output of a bilinear map, the bilinear map being applied to a first bilinear map input and a second bilinear map input, said first bilinear map input being given by a receiver public key associated with the receiver device to a power of said auxiliary value, said second bilinear map input being the output of the first cryptographic hash function applied to a recipient trusted center identifier associated with the receiver trusted center;
determine said encrypted message by applying a cipher to said given message, said cipher using said random secret key as encryption key; and
determine said third component by applying the second cryptographic hash function to the output of a product between a first product input and a second product input to the power of said auxiliary value, said first product input being the output of the bilinear map applied to a transmitter private key and to an intermediate transmitter trusted center public key received from the receiver trusted center, said second input being the output of the bilinear map applied to an intermediate receiver trusted center public key received from the receiver trusted center and to a receiver public key associated with the receiver device,
wherein at least one of the transmitter device, the receiver device, the transmitter trusted center, and the receiver trusted center comprise a hardware processor.

2. The identity-based cryptographic system of claim 1, wherein the transmitter trusted center is associated with a transmitter trusted center identifier, the transmitter device being configured to receive, from said transmitter trusted center, transmitter system parameters, a transmitter public key, and a transmitter private key, said transmitter system parameters comprising a prime number, two algebraic groups of order equal to said prime number, an admissible bilinear map, said first cryptographic hash function, said second cryptographic hash function, said third cryptographic hash function, and the transmitter trusted center public key associated with said transmitter trusted center identifier, said transmitter system parameters being dependent on said transmitter trusted center identifier and a transmitter trusted center security parameter held by said transmitter trusted center, said transmitter private key being dependent on said transmitter system parameters, a transmitter identifier associated with said transmitter device, and on a transmitter trusted center master key held by said transmitter trusted center.

3. The identity-based cryptographic system of claim 2, wherein the transmitter device is configured to verify the transmitter trusted center public key by comparing a first value to a second value, said first value being determined by applying said bilinear map to the transmitter private key and the transmitter trusted center public key, said second value being determined by applying said bilinear map to the transmitter public key and an intermediate transmitter trusted center public key received from the receiver trusted center, the transmitter device being configured to verify the transmitter authentication key by comparing a third value to a fourth value, said third value being determined by applying said bilinear map to the transmitter trusted center public key and the transmitter authentication key, said fourth value being determined by applying said bilinear map to said intermediate transmitter trusted center public key and the receiver trusted center public key received from the receiver trusted center.

4. The identity-based cryptographic system of claim 1, wherein the receiver device is configured to receive, from the transmitter device, said encrypted message, the transmitter device being associated with a transmitter identifier, and the receiver device being associated with a receiver identifier, the receiver device being configured to receive, from the receiver trusted center a receiver public key and a receiver private key, said receiver trusted center being associated with a receiver trusted center identifier, the receiver device being configured to:
apply the first cryptographic hash function to the transmitter identifier, which provides a transmitter public key;
determine a secret key from the first component, the second component and the receiver private key; and
wherein the receiver device is configured to decrypt an encoded message using a decipher that uses a secret key as a decryption key.

5. The identity-based cryptographic system of claim 4, wherein the receiver device is further configured to receive, from the receiver trusted center, receiver system parameters, said receiver system parameters comprising a prime number, two algebraic groups of order equal to said prime number, an admissible bilinear map, said first cryptographic hash function, said second cryptographic hash function, said third cryptographic hash function, and the receiver trusted center public key associated with said receiver trusted center identifier, said receiver system parameters being dependent on said receiver trusted center identifier and a receiver trusted center security parameter held by said receiver trusted center, said receiver private key being dependent on said receiver system parameters, said receiver identifier associated with said receiver device, and on a receiver trusted center master key held by said receiver trusted center.

6. The identity-based cryptographic system of claim 5, wherein the receiver device is configured to:
verify the receiver trusted center public key by comparing an output of the bilinear map applied to the receiver private key and to the receiver trusted center public key with the output of the bilinear map applied to a receiver public key and to an intermediate receiver trusted center public key received from the receiver trusted center;

verify a receiver authentication key received from the transmitter trusted center and the transmitter trusted center public key by comparing the output of the bilinear map, applied to the receiver trusted center public key and to the receiver authentication key, with the output of the of the bilinear map, applied to the intermediate receiver trusted center public key and to the transmitter trusted center public key received from the transmitter trusted center; and verify a transmitter authentication key received from the transmitter trusted center by comparing the output of the bilinear map, applied to the transmitter trusted center public key and to the transmitter authentication key, with the output of the bilinear map, applied to the intermediate transmitter trusted center public key received from the receiver trusted center and to the receiver trusted center public key.

7. The identity-based cryptographic system of claim 5, wherein, the receiver device is configured to decrypt the encoded message if the receiver trusted center public key, the receiver authentication key, and the transmitter authentication key are verified, and wherein the determination of the secret key comprises applying a subtraction operation between the second component comprised in the ciphertext set and an output of the second cryptographic hash function applied to a result of the bilinear map, applied to the receiver private key and to the first component comprised in the ciphertext set, the receiver device being further configured to:

determine an auxiliary value by applying the third cryptographic hash function to said secret key and an original message; and verify the transmitter identity by comparing the third component comprised in the ciphertext set with the output of the second cryptographic hash function, applied to a value to a power of said auxiliary value, said value determined as a product between:

the output of the bilinear map applied to the transmitter public key and to the intermediate transmitter trusted center public key; and the output of the bilinear map applied to the transmitter authentication key and to the receiver private key.

8. The identity-based cryptographic system of claim 1, wherein said function is an exponentiation function, the scalar being the exponent of the function, or a scalar multiplication if the receiver trusted center public key corresponds to a point of an elliptic curve.

9. An identity-based cryptosystem comprising a transmitter trusted center and a receiver trusted center, wherein the transmitter trusted center is configured to receive, from a transmitter device, a transmitter identifier, and to determine a transmitter private key from a transmitter trusted center master key, transmitter system parameters and the transmitter identifier, wherein the transmitter trusted center is associated with a transmitter trusted center identifier, the transmitter trusted center being configured to determine a transmitter public key by applying a first hash function to the transmitter identifier and to determine a transmitter private key by applying a function defined by a base and a scalar, the base being equal to said transmitter public key, and the scalar being equal to an inverse of the transmitter trusted center master key, the transmitter trusted center being configured to transmit the transmitter private key to the transmitter device, wherein the receiver trusted center is configured to receive, from the transmitter trusted center, the transmitter trusted center identifier, and to determine said transmitter trusted center private key from a receiver trusted center master key, receiver system parameters and the transmitter trusted center identifier, the receiver trusted center being configured to determine an intermediate transmitter trusted center public key by applying the first hash function to the transmitter trusted center identifier and to determine the transmitter trusted center private key by applying a function defined by a base and a scalar, the base being equal to said intermediate transmitter trusted center public key, and the scalar being equal to the inverse of the receiver trusted center master key, wherein at least one of the transmitter device, the receiver device, the transmitter trusted center, and the receiver trusted center comprise a hardware processor.

10. The identity-based cryptosystem of claim 9, wherein the receiver trusted center is configured to receive, from the receiver device, a receiver identifier, and to determine a receiver private key from the receiver trusted center master key, receiver system parameters and a receiver identifier, the receiver trusted center being configured to determine a receiver public key by applying the first hash function to the receiver identifier and to determine the receiver private key by applying a function defined by a base and a scalar, the base being equal to said receiver public key, and the scalar being equal to the inverse of the receiver trusted center master key.

11. The identity-based cryptosystem of claim 9, wherein the transmitter trusted center is associated with a transmitter trusted center identifier and holds a transmitter trusted center security parameter, the transmitter trusted center being configured to determine said transmitter system parameters and said transmitter trusted center master key from said transmitter trusted center security parameter and said transmitter trusted center identifier, said transmitter system parameters comprising a prime number, two algebraic groups of order equal to said prime number, an admissible bilinear map, a first cryptographic hash function, a second cryptographic hash function, a third cryptographic hash function, and a transmitter trusted center public key associated with said transmitter trusted center identifier.

12. The identity-based cryptosystem of claim 10, wherein the receiver trusted center is associated with a receiver trusted center identifier and holds a receiver trusted center security parameter, the receiver trusted center being configured to determine said receiver system parameters and said receiver trusted center master key from said receiver trusted center security parameter and said receiver trusted center identifier, said receiver system parameters comprising a prime number, two algebraic groups of order equal to said prime number, an admissible bilinear map, a first cryptographic hash function, a second cryptographic hash function, a third cryptographic hash function, and a receiver trusted center public key associated with said receiver trusted center identifier.

13. The identity-based cryptosystem of claim 9, wherein the transmitter trusted center is configured to determine two public authentication keys comprising a transmitter authentication key and a receiver authentication key from the transmitter trusted center master key, the transmitter trusted center private key, and a receiver trusted center public key, the transmitter trusted center being configured to determine the transmitter authentication key by applying a function defined by a base equal to said transmitter trusted center public key and a scalar equal to the inverse of said transmitter trusted center master key, and to determine the receiver authentication key by applying a function defined by a base equal to said transmitter trusted center private key and a scalar equal to said transmitter trusted center master key.

\* \* \* \* \*